(12) United States Patent
Onishi et al.

(10) Patent No.: US 11,219,190 B2
(45) Date of Patent: Jan. 11, 2022

(54) ANIMAL EXCRETA DISPOSAL SHEET

(71) Applicant: Unicharm Corporation, Ehime (JP)

(72) Inventors: Hideyuki Onishi, Kanonji (JP); Yasuhiro Sasano, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 262 days.

(21) Appl. No.: 16/473,276

(22) PCT Filed: Dec. 29, 2016

(86) PCT No.: PCT/JP2016/089218
§ 371 (c)(1),
(2) Date: Oct. 31, 2019

(87) PCT Pub. No.: WO2018/123068
PCT Pub. Date: Jul. 5, 2017

(65) Prior Publication Data
US 2020/0187451 A1    Jun. 18, 2020

(51) Int. Cl.
*A01K 1/015* (2006.01)
*A01K 1/01* (2006.01)

(52) U.S. Cl.
CPC .......... *A01K 1/0157* (2013.01); *A01K 1/0107* (2013.01)

(58) Field of Classification Search
CPC ............................ A01K 1/0157; A01K 1/0107
See application file for complete search history.

(56) References Cited

U.S. PATENT DOCUMENTS 4,047,499 A * 9/1977 Janecek ............... A01K 1/0107
119/168
4,934,316 A * 6/1990 Mack .................. A01K 1/0107
119/169

(Continued)

FOREIGN PATENT DOCUMENTS

JP          2111363 A    4/1990
JP        10313721 A   12/1998

(Continued)

OTHER PUBLICATIONS

English Abstract and Machine Translation for Japanese Publication No. JP6053123B2, published Dec. 27, 2016, 54 pgs.

(Continued)

*Primary Examiner* — Magdalena Topolski
(74) *Attorney, Agent, or Firm* — Fredrikson & Byron, P.A.

(57) ABSTRACT

The present invention provides an animal excreta disposal sheet capable of ensuring sufficient bonding strength between a surface sheet and a back sheet and preventing urine excreted from an animal from leaking to the outer side in the planar direction. This animal excreta disposal sheet (1) comprises: a center part ($A_1$) that is located at the center of the animal excreta disposal sheet (1) and that is defined as a part in which a surface sheet (2), an absorbent body (3) and a back sheet (4) overlap one another in the thickness direction; and an outer circumferential part ($A_2$) extending from the outer edge of the center part ($A_1$) toward the outer edge of the animal excreta disposal sheet (1). The animal excreta disposal sheet (1) further comprises in the outer circumferential part ($A_2$): a joining part (5) which extends so as to surround the center part ($A_1$) and in which the surface sheet (2) and the back sheet (4) are joined via an adhesive; and a water-stop part (6) which extends so as to overlap at least a part of the joining part (5) in the thickness direction (Continued)

and is exposed so as not to protrude from a first surface which is a surface to which excreta is delivered.

6 Claims, 12 Drawing Sheets

(56) References Cited

U.S. PATENT DOCUMENTS

| | | | | |
|---|---|---|---|---|
| 5,488,929 | A * | 2/1996 | Pierson | A01K 1/0125 119/170 |
| 6,244,216 | B1 * | 6/2001 | Ochi | A01K 1/0107 119/169 |
| 6,645,597 | B1 * | 11/2003 | Swain | A01K 1/0107 428/68 |
| 7,388,123 | B2 * | 6/2008 | Cowell | A61F 13/475 424/402 |
| 2004/0197596 | A1 * | 10/2004 | Connor | B01D 53/02 428/630 |
| 2005/0109284 | A1 * | 5/2005 | Helfman | A01K 1/0157 119/161 |
| 2006/0200104 | A1 * | 9/2006 | Kaneko | A01K 1/0107 604/358 |
| 2006/0260556 | A1 * | 11/2006 | Renforth | A01K 1/0107 119/169 |
| 2006/0260559 | A1 * | 11/2006 | Fry | A01K 1/0107 119/526 |
| 2009/0000557 | A1 * | 1/2009 | Takahashi | A01K 1/0107 119/161 |
| 2010/0154716 | A1 * | 6/2010 | Smith | A01K 1/0107 119/169 |
| 2011/0232578 | A1 * | 9/2011 | Duke | B01J 20/2804 119/172 |
| 2012/0152175 | A1 * | 6/2012 | Li | A01K 1/0107 119/161 |
| 2014/0261209 | A1 * | 9/2014 | Haddad | A01K 1/0107 119/161 |
| 2014/0283752 | A1 * | 9/2014 | Lowe | A01K 1/0107 119/161 |
| 2016/0263874 | A1 * | 9/2016 | Cai | B32B 27/12 |
| 2020/0281155 | A1 * | 9/2020 | Axelrod | B32B 27/32 |
| 2020/0390058 | A1 * | 12/2020 | Onishi | B32B 27/32 |

FOREIGN PATENT DOCUMENTS

| | | |
|---|---|---|
| JP | 200911180 A | 1/2009 |
| JP | 201479291 A | 5/2014 |
| JP | 3192208 U | 7/2014 |
| JP | 6053123 B2 | 12/2016 |

OTHER PUBLICATIONS

English Abstract and Machine Translation for Japanese Publication No. 3192208 U, published Jul. 31, 2014, 17 pgs.
English Abstract and Machine Translation for Japanese Publication No. 2014079291 A, published May 8, 2014, 24 pgs.
English Abstract and Machine Translation for Japanese Publication No. JPH02111363 A, published Apr. 24, 1990, 6 pgs.
English Abstract and Machine Translation for Japanese Publication No. 2009011180 A, published Jan. 22, 2009, 12 pgs.
English Abstract and Machine Translation for Japanese Publication No. JPH10313721 A, published Dec. 2, 1998, 8 pgs.
English Translation of International Search Report for International Application No. PCT/JP2016/089218, from which the instant application is based, 2 pgs.

* cited by examiner

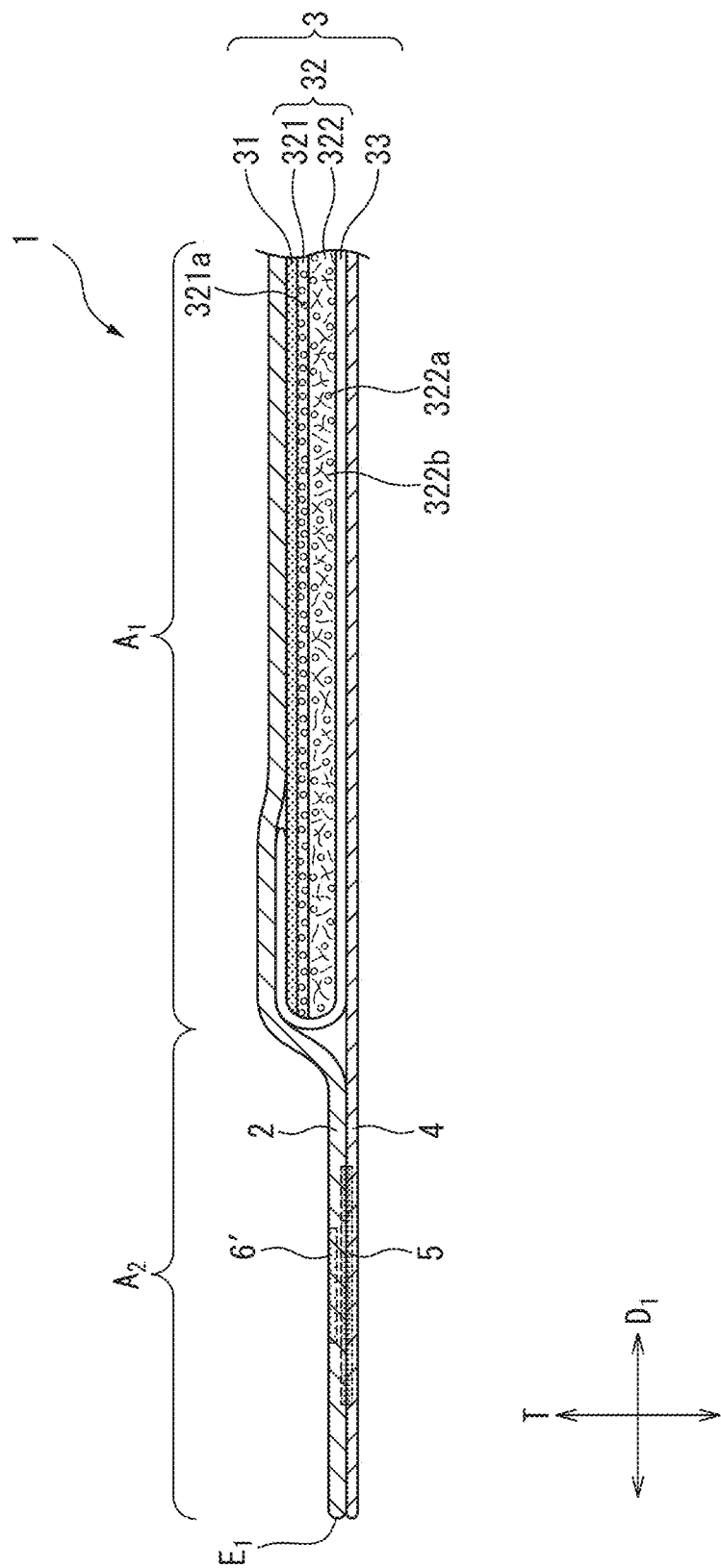

ANIMAL EXCRETA DISPOSAL SHEET

RELATED APPLICATIONS

This application is a 35 U.S.C. 371 national stage filing from and claims priority to International Application No. PCT/JP2016/089218, filed, Dec. 29, 2016, the teachings of which are incorporated herein by reference.

FIELD

The present invention relates to an excreta treatment sheet for animals to be used when rearing animals such as dogs.

BACKGROUND

Among existing excreta treatment sheets for animals, for treatment of excreta such as urine that have been excreted by pets such as dogs, there are known excreta treatment sheets for animals that comprise a liquid-permeable top sheet, a liquid-impermeable back sheet, and an absorbent body disposed between the sheets.

Excreta treatment sheets for animals are also known that are designed to minimize outward leakage of urine excreted by a pet from the edges of the sheets. An example of such an excreta treatment sheet for animals is the one disclosed in PTL 1, which is a pet sheet having a liquid-permeable top sheet, a liquid-impermeable back sheet, and an absorbent body situated between the top sheet and back sheet, the top sheet and back sheet being joined at the side edges, wherein flaps rising up from the sheet surface are formed at least at the pair of mutually opposite side edges, parallel to the sheet edges. Since the pet sheet disclosed in PTL 1 has flaps formed rising up from the sheet surface, then even if a pet excretes urine near the edges of the pet sheet, the urine is blocked at the flap portions and outward leakage of urine from the edges of the pet sheet can be prevented.

CITATION LIST

Patent Literature

[PTL 1] Japanese Unexamined Patent Publication No. 10-313721

SUMMARY

Technical Problem

However, in an excreta treatment sheet for animals wherein flaps for blockage of urine are formed protruding from the sheet surface at the side edges, as with the pet sheet disclosed in PTL 1, once the excreta treatment sheet for animals has been folded and packed after production, the flaps may collapse under the pressure of packing, or when the pet (animal) steps onto the sheet for excretion, it may tread on the flaps and cause them to collapse, so that the flaps fail to adequately function during use and urine excreted by the animal may get transmitted onto the surface of the excreta treatment sheet for animals, resulting in "transmitted leakage" in which leaking occurs toward the outer sides in the in-plane direction. Furthermore, collapse of the flaps causes the joints between the top sheet and back sheet to detach at the portions corresponding to the flaps, and as a result, urine that has passed through the top sheet or urine that has leaked from the absorbent body has sometimes leaked from the outer edges of the excreta treatment sheet for animals, through the portions where the joints between the top sheet and back sheet have become detached.

In addition, in cases where the urine-blocking flaps are each constructed so as to include a hydrophilic top sheet, as in the pet sheet disclosed in PTL 1, "bleeding" has sometimes occurred in the form of outward leakage of urine in the in-plane direction through the interior of the hydrophilic top sheet.

It is an object of the present invention to provide an excreta treatment sheet for animals that can adequately ensure bonding strength between the top sheet and back sheet while making it less likely for urine that has been excreted by the animal to leak outward in the in-plane direction.

Solution to Problem

One aspect (aspect 1) of the invention is an excreta treatment sheet for animals comprising a liquid-permeable top sheet, a liquid-impermeable back sheet and an absorbent body situated between these sheets, wherein the excreta treatment sheet for animals has a first surface as an excreta supply surface and a second surface as a surface on a side opposite the first surface, while also having, in a plan view, a center section located at a center of the excreta treatment sheet for animals and delineated as a portion where the top sheet, absorbent body and back sheet overlap in a thickness direction, and an outer peripheral section enclosing the center section and extending from outer edges of the center section toward outer edges of the excreta treatment sheet for animals, and the excreta treatment sheet for animals also comprises, at the outer peripheral section, a joining section extending to surround the center section and having the top sheet and back sheet joined by an adhesive, and a water-blocking section extending so as to overlap in the thickness direction with at least a portion of the joining section, and being exposed without protruding from the first surface.

Since the excreta treatment sheet for animals of aspect 1 comprises, at the outer peripheral section, the joining section extending to surround the center section and having the top sheet and back sheet joined by an adhesive, and the water-blocking section extending so as to overlap in the thickness direction with at least a portion of the joining section, and being exposed without protruding from the first surface, the joining section can adequately ensure bonding strength between the top sheet and back sheet while minimizing "bleeding" wherein urine excreted into the excreta treatment sheet for animals is transmitted inside the top sheet and leaks outward in the in-plane direction, and the water-blocking section can minimize "transmitted leakage" wherein urine excreted into the excreta treatment sheet for animals is transmitted onto the surface of the top sheet and leaks outward in the in-plane direction.

Moreover, since the water-blocking section exhibits a water-blocking effect while exposed in a manner without protruding from the first surface of the excreta treatment sheet for animals, the excreta treatment sheet for animals is unlikely to have reduced water-blocking action even when it is packed, or tread on by an animal (i.e., it can adequately exhibit the function of the water-blocking section), and the aforementioned transmitted leakage can be stably minimized.

Therefore, the excreta treatment sheet for animals of aspect 1 can adequately ensure bonding strength between the top sheet and back sheet while making it less likely for urine excreted into the excreta treatment sheet for animals to leak outward in the in-plane direction.

As used herein, the phrase "without protruding from the first surface of the excreta treatment sheet for animals" means not intentionally formed so as to protrude from the first surface of the excreta treatment sheet for animals for the purpose of blocking urine (i.e., not being shaped by molding or folding with the purpose of protruding from the first surface of the excreta treatment sheet for animals), and it does not exclude aspects such as any small degree of swelling and rising that occurs unintentionally during the course of production of the excreta treatment sheet for animals, or fine irregularities that may be produced in the structures of the members (such as nonwoven fabrics) forming the excreta treatment sheet for animals (or in other words, the water-blocking sections of the excreta treatment sheet for animals of the invention may include such aspects).

According to another aspect (aspect 2) of the invention, in the excreta treatment sheet for animals of aspect 1, the excreta treatment sheet for animals has a quadrilateral outer shape with a first direction and a second direction that are mutually perpendicular, and the water-blocking section overlaps with the absorbent body in either or both the first direction and second direction.

Since the water-blocking section (and the joining section overlapping with the water-blocking section in the thickness direction) in the excreta treatment sheet for animals of aspect 2 overlaps with the absorbent body in either or both the first direction and second direction, it becomes easy to inhibit transmitted leakage especially of urine excreted into the center section of the excreta treatment sheet for animals, and also easy to inhibit bleeding of urine leaked from the absorbent body.

According to yet another aspect (aspect 3) of the invention, in the excreta treatment sheet for animals of aspect 2, the water-blocking section extends continuously along either or both the first direction and the second direction.

Since the excreta treatment sheet for animals of aspect 3 has the water-blocking section extending continuously along either or both the first direction and the second direction, it is possible to shut off flow channels of urine flowing in the direction transversing the direction in which the water-blocking section extends (i.e., the direction transversing the water-blocking section), and to make it even less likely for outward leakage of urine in the in-plane direction to occur.

According to yet another aspect (aspect 4) of the invention, in the excreta treatment sheet for animals of aspect 2, the water-blocking section includes:

a first water-blocking section extending intermittently along either or both the first direction and the second direction, the first water-blocking section being situated so that first water-blocking subdivisions and first intermittent sections are alternately aligned, and a second water-blocking section extending intermittently along a direction parallel to a direction in which the first water-blocking section extends, on an outer side in a direction perpendicular to the direction in which the first water-blocking section extends, the second water-blocking section being situated so that second water-blocking subdivisions and second intermittent sections are alternately aligned, and the second water-blocking subdivisions overlap with the first intermittent sections and each of facing ends of adjacent two first water-blocking subdivisions sandwiching the first intermittent sections in the direction perpendicular to the direction in which the first water-blocking section extends.

Since the water-blocking section of the excreta treatment sheet for animals of aspect 4 includes a first water-blocking section and a second water-blocking section situated in the aforementioned specified arrangement, then when urine flowing in the direction transversing the water-blocking section has passed through the first intermittent sections of the first water-blocking section and reached the second water-blocking section, the urine can be blocked by the second water-blocking subdivisions of the second water-blocking section while being diffused along the direction in which the water-blocking section extends. Thus, even when excreted urine exceeds a certain quantity, the excreta treatment sheet for animals of aspect 4 can diffuse urine at the water-blocking section in the direction in which the water-blocking section extends, making it unlikely to leak outward in the in-plane direction.

According to yet another aspect (aspect 5) of the invention, in the excreta treatment sheet for animals of any one of aspects 1 to 4, the top sheet is composed of a sheet-like fiber structure, and the water-blocking section is composed of a fused section that is fused by constituent fibers of the fiber structure being melted together.

Since the excreta treatment sheet for animals of aspect 5 has the water-blocking section composed of the fused section of the constituent fibers of the fiber structure forming the top sheet, and urine is unlikely to pass through the fused section that lack gaps with reduced hydrophilicity due to melting, it is possible to exhibit a more excellent water-blocking effect at the water-blocking section.

In addition, since the top sheet and back sheet can be joined by higher bonding strength, because not only the adhesive but also the fused section contributes to joining between the top sheet and back sheet, it is possible for urine leaked from the absorbent body to be more reliably unlikely to leak outward in the in-plane direction.

Furthermore, since the water-blocking section composed of the fused section has different coloration than the periphery (due to differences in luminance and color shade, i.e. color differences) and is readily visible, the owner of the animal can easily see the water-blocking section, allowing the excreta treatment sheet for animals of aspect 5 to provide the owner with a feeling of assurance that the excreta treatment sheet for animals is unlikely to leak urine to the outside.

According to yet another aspect (aspect 6) of the invention, in the excreta treatment sheet for animals of any one of aspects 1 to 5, the water-blocking section is composed of an integrated part where the top sheet, adhesive and back sheet are integrated in the thickness direction.

Since the excreta treatment sheet for animals of aspect 6 has the water-blocking section composed of the integrated part where the top sheet, adhesive and back sheet are integrated in the thickness direction, then gaps that can serve as flow channels for urine are less likely to form at the water-blocking section, from the supply surface of the top sheet up to the non-supply surface of the back sheet, and the water-blocking section can more reliably shut off flow channels of urine flowing outward in the in-plane direction of the excreta treatment sheet for animals.

In addition, if the water-blocking section is constructed by such the integrated part, then it is possible to join the top sheet and back sheet with higher bonding strength, the top sheet and back sheet are less likely to separate, and urine leaked from the absorbent body will be unlikely to leak out for a prolonged period of time.

According to yet another aspect (aspect 7) of the invention, in the excreta treatment sheet for animals of any one of aspects 1 to 4, the top sheet is composed of a sheet-like fiber structure, and the water-blocking section is composed of a semi-fused section that is fused by constituent fibers of the fiber structure being partially melted together.

Since the excreta treatment sheet for animals of aspect 7 has the water-blocking section composed of the semi-fused section of the constituent fibers of the fiber structure forming the top sheet, urine that has reached the water-blocking section can be drawn in between the partially fused constituent fibers due to capillary movement, while being diffused along the direction in which the water-blocking section extends. Thus, even when excreted urine exceeds a certain quantity, the excreta treatment sheet for animals of aspect 7 can diffuse urine at the water-blocking section in the direction in which the water-blocking section extends, making it unlikely to leak outward in the in-plane direction.

Furthermore, since the top sheet and back sheet can be joined by higher bonding strength, because not only the adhesive but also the semi-fused section contributes to a certain extent to joining between the top sheet and back sheet, it is possible for urine leaked from the absorbent body to be more reliably unlikely to leak outward in the in-plane direction.

Furthermore, since the water-blocking section composed of the semi-fused section has different coloration than the periphery and is readily visible, the owner can easily see the water-blocking section, allowing the excreta treatment sheet for animals of aspect 7 to provide the owner with a feeling of assurance that the excreta treatment sheet for animals is unlikely to leak urine to the outside.

According to yet another aspect (aspect 8) of the invention, the water-blocking section in the excreta treatment sheet for animals of any one of aspects 1 to 4 is composed of a water-repellent coating film.

Since the water-blocking section of the excreta treatment sheet for animals of aspect 8 is composed of a water-repellent coating film, the water-repellent coating film can repel urine that has flowed in the direction transversing the water-blocking section, so that an excellent water-blocking effect can be exhibited. Furthermore, since the water-repellent coating film that has repelled urine is readily visible, the owner can easily see the water-blocking section composed of the water-repellent coating film, allowing the excreta treatment sheet for animals of aspect 8 to provide the owner with a feeling of assurance that the excreta treatment sheet for animals is unlikely to leak urine to the outside.

According to yet another aspect (aspect 9) of the invention, in the excreta treatment sheet for animals of any one of aspects 1 to 8, the top sheet has a protrusion-recess structure on a surface on an excreta supply surface side.

Since the top sheet of the excreta treatment sheet for animals of aspect 9 has a protrusion-recess structure on the surface on the excreta supply surface side, and the top sheet having such a protrusion-recess structure has excellent liquid permeability allowing urine to permeate in the thickness direction while the urine is unlikely to be transmitted to the surface of the top sheet, urine supplied to the first surface of the excreta treatment sheet for animals can be rapidly caused to migrate to the absorbent body, and outward leakage of urine in the in-plane direction can be made even less likely to occur.

Advantageous Effects of Invention

The excreta treatment sheet for animals of the invention can adequately ensure bonding strength between the top sheet and back sheet while making it less likely for urine that has been excreted by the animal to leak outward in the in-plane direction.

BRIEF DESCRIPTION OF DRAWINGS

FIG. 12 is a partial cross-sectional view of the excreta treatment sheet for animals 1 of FIG. 11, along line XII-XII.

DESCRIPTION OF EMBODIMENTS

Figure 1:
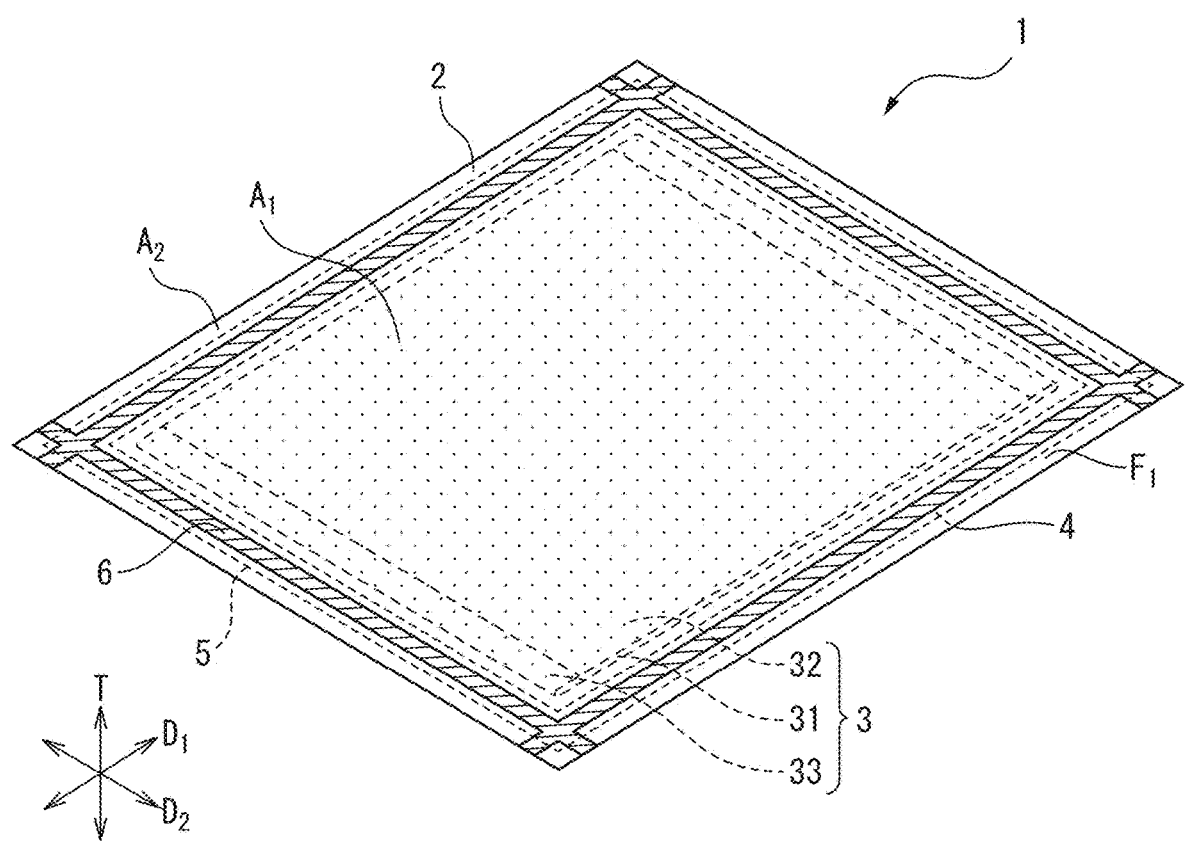
FIG. 1 is a perspective view of an excreta treatment sheet for animals 1 according to a first embodiment of the invention, in the expanded state.

Preferred embodiments of the excreta treatment sheet for animals according to the invention will now be described in detail with reference to the accompanying drawings. Throughout the present description, unless otherwise specified, the concept of "an object (for example, an excreta treatment sheet for animals) situated on the horizontal plane in the expanded state with the excreta supply surface facing upward, being viewed in the thickness direction of the object from the top side in the vertical direction" will be referred to simply by the term "plan view".

Throughout the present description, the "lengthwise direction" is the "long direction of the lengths of a longitudinal object (for example, an excreta treatment sheet for animals) in a plan view", the "widthwise direction" is the "short direction of the lengths of a longitudinal object in the plan view (short direction)", and the "thickness direction" is the "vertical direction of an object placed on the horizontal plane in the expanded state", with the lengthwise direction, widthwise direction and thickness direction being in a mutually perpendicular relationship. Also throughout the present description, the "in-plane direction" is the "direction in which the plane of an approximately sheet-like object (such as an excreta treatment sheet for animals) extends in a plan view (i.e., the horizontal plane direction)", the in-plane direction being in a mutually perpendicular relationship with the thickness direction.

Also throughout the present description, the "relatively proximal side in the first direction (for example, the lengthwise direction) of the excreta treatment sheet for animals with respect to a center axis line $C_2$ located at the center in the first direction of the excreta treatment sheet for animals and extending in the second direction (for example, the widthwise direction) that is perpendicular to the first direction" will be referred to as "the inner side in the first direction", and the "relatively distal side in the first direction of the excreta treatment sheet for animals with respect to the center axis line $C_2$" will be referred to as the "outer side in the first direction". Also throughout the present description, the "relatively proximal side in the second direction of the excreta treatment sheet for animals with respect to a center axis line $C_1$ located at the center in the second direction of the excreta treatment sheet for animals and extending in the first direction that is perpendicular to the second direction" will be referred to as "the inner side in the second direction", and the "relatively distal side in the second direction of the excreta treatment sheet for animals with respect to the center axis line $C_1$" will be referred to as the "outer side in the second direction". Throughout the present description, the "relatively proximal side with respect to the center of a sheet-like object (the intersection between the center axis line extending in the first direction and the center axis line extending in the second direction) in the in-plane direction of the object" will be referred to as "the inner side in the in-plane direction", and the "relatively distal side with respect to the center of an approximately sheet-like object, in the in-plane direction of the object" will be referred to as "the outer side in the in-plane direction".

Also throughout the present description, the "relatively proximal side to the excreta supply surface in the thickness direction of the excreta treatment sheet for animals" will be referred to as the "supply surface side", and the "relatively distal side to the excreta supply surface in the thickness direction of the excreta treatment sheet for animals" will be referred to as the "non-supply surface side". Incidentally, throughout the present description, the "surface on the supply side of the excreta treatment sheet for animals" will be referred to simply as "supply surface", and the "surface on the non-supply surface side of the excreta treatment sheet for animals" will be referred to simply as "non-supply surface". Since the non-supply surface side is also the relatively proximal side to the mounting surface described below, the term "non-supply surface side" may also be referred to as "mounting surface side" throughout the present description. Similarly, the term "non-supply surface" may be referred to as "mounting surface" throughout the present description.

Figure 2:
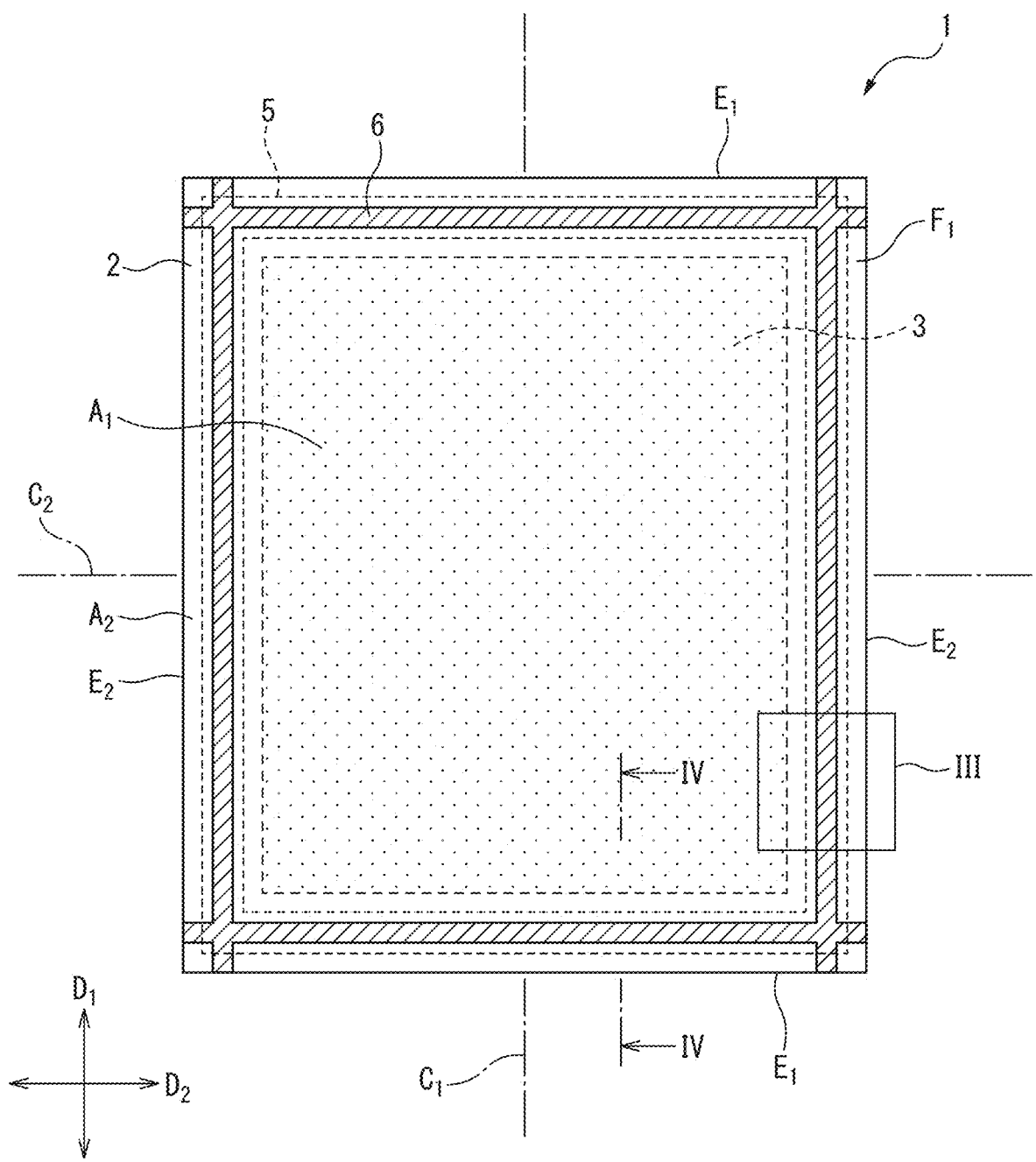
FIG. 2 is a plan view of the excreta treatment sheet for animals 1 of the first embodiment of the invention, as viewed in the thickness direction from the top sheet 2 side, in the expanded state.
Figure 3:
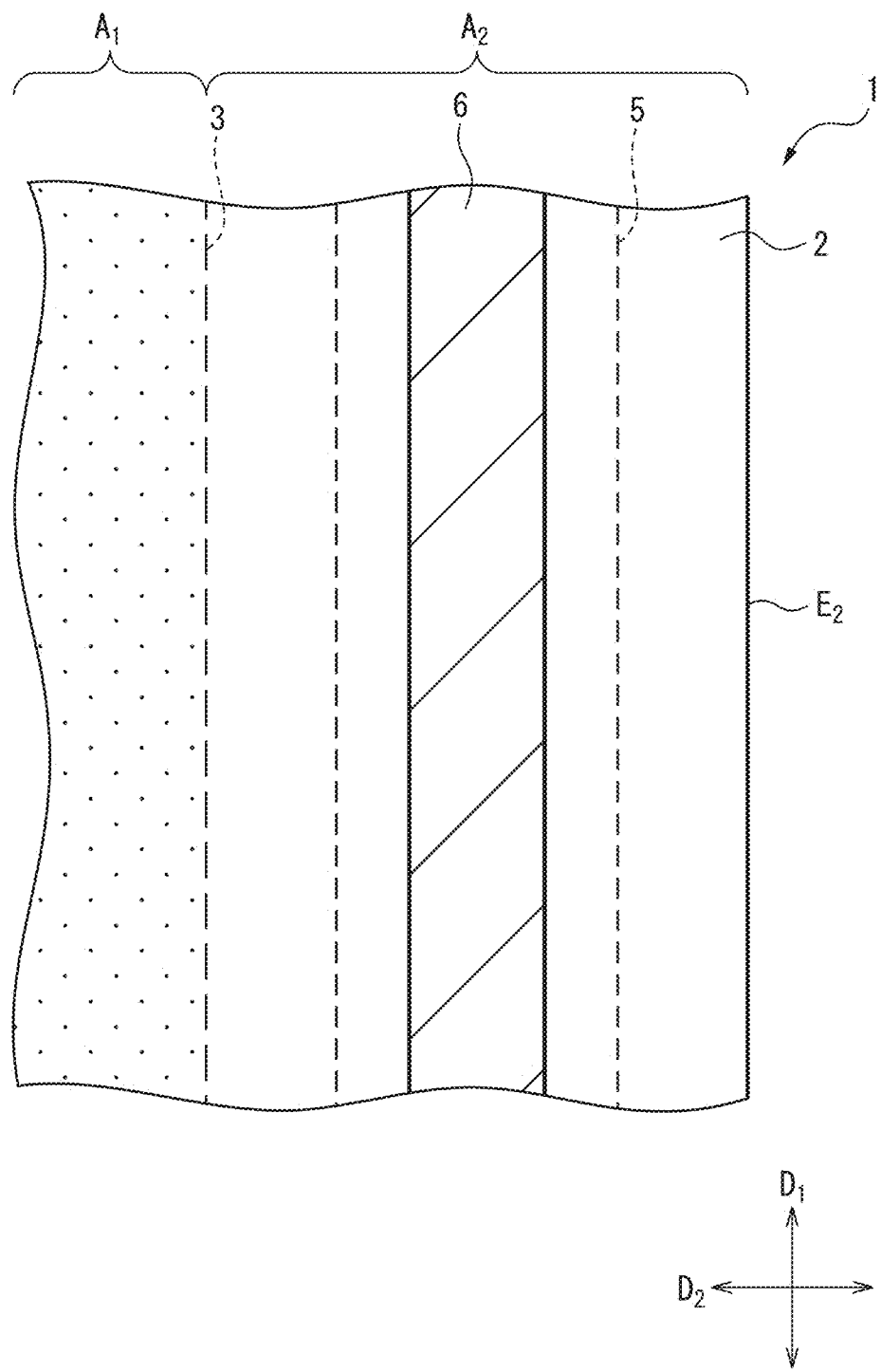
FIG. 3 is an enlarged plan view of the main part of the excreta treatment sheet for animals 1 of FIG. 2 defined by the enclosing line III.

FIG. 1 is a perspective view of an excreta treatment sheet for animals 1 according to a first embodiment of the invention, in the expanded state, and FIG. 2 is a plan view of the excreta treatment sheet for animals 1 as viewed in the thickness direction from the top sheet 2 side, in the expanded state. FIG. 3 is an enlarged plan view of the main part of the excreta treatment sheet for animals 1 of FIG. 2 defined by the enclosing line III, and FIG. 4 is a partial cross-sectional view of the excreta treatment sheet for animals 1 of FIG. 2, along line IV-IV.

As shown in FIG. 1 and FIG. 2, the excreta treatment sheet for animals 1 of the first embodiment of the invention has a first direction $D_1$, a second direction $D_2$ and a thickness direction T which are mutually perpendicular, and is constructed of a layered sheet having an essentially rectangular outer shape that is longitudinal with length in the first direction $D_1$, in the plan view. According to the invention, the outer shape of the excreta treatment sheet for animals is not limited to such an essentially rectangular shape, and any desired outer shape such as square, polygonal, circular or elliptical may be employed, depending on the purpose of use, design, etc. Furthermore, the outer dimensions of the excreta treatment sheet for animals in the plan view may be set as appropriate depending on the size and type of animal to which the excreta treatment sheet is to be applied, and when the animal is a dog, for example, the length in the first direction $D_1$ (lengthwise direction) is about 400 mm to 1200 mm and the length in the second direction $D_2$ (widthwise direction) is about 250 mm to 800 mm.

Figure 4:
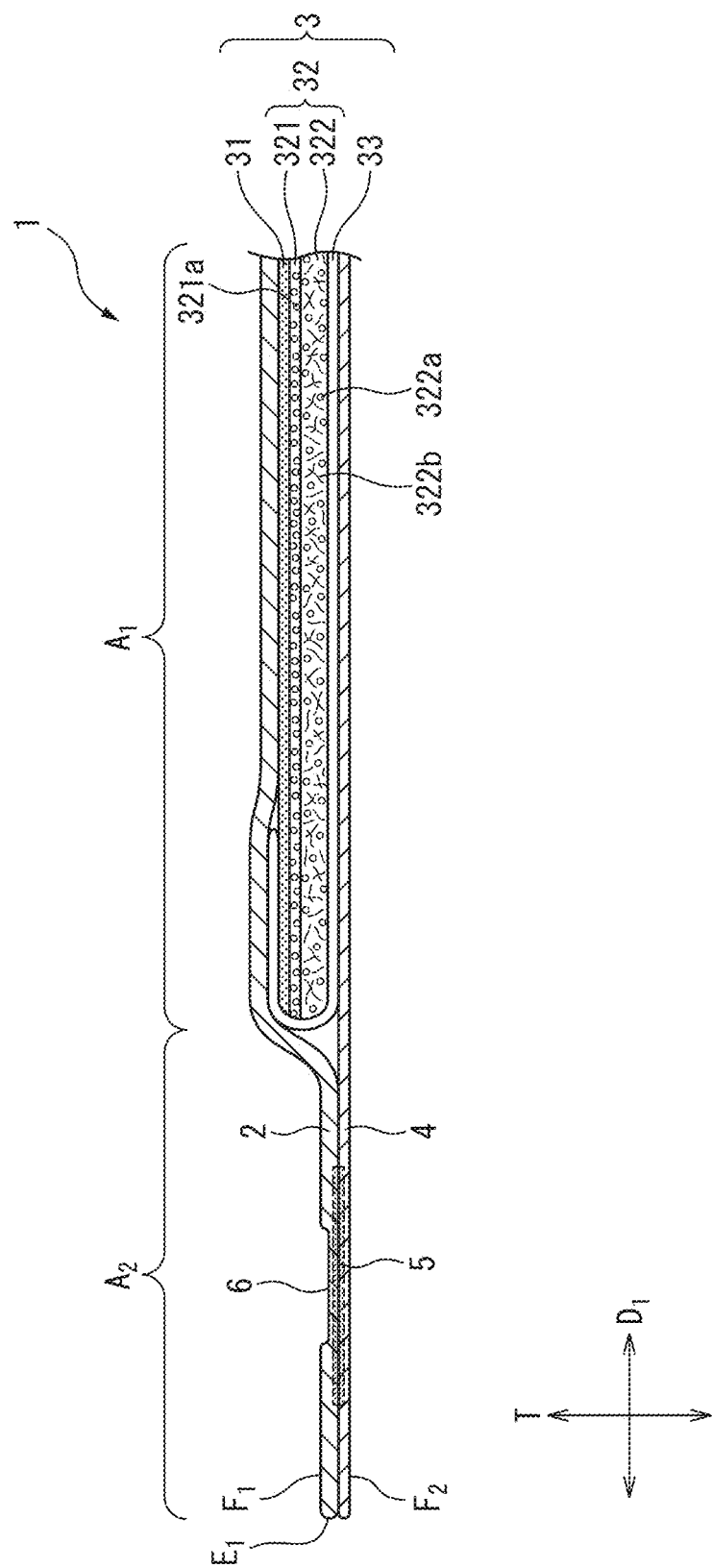
FIG. 4 is a partial cross-sectional view of the excreta treatment sheet for animals 1 of FIG. 2, along line IV-IV.

As shown in FIG. 2 and FIG. 4, the excreta treatment sheet for animals 1 of the first embodiment described above comprises, in the thickness direction T, a top sheet 2 made of a liquid-permeable sheet-like fiber structure forming a first surface $F_1$ as the supply surface for excreta discharged from an animal, a back sheet 4 made of a liquid-impermeable resin film forming a second surface $F_2$ as the setting surface on the opposite side from the supply surface (i.e., the side facing the floor surface or ground on which the excreta treatment sheet for animals is to be set), and a liquid-absorbing absorbent body 3 situated between these two sheets, and it further has, in the plan view, a center section $A_1$ situated at the center of the excreta treatment sheet for animals 1 and delineated as the portion where the top sheet 2, absorbent body 3 and back sheet 4 overlap in the thickness direction T, and outer peripheral sections $A_2$ enclosing the center section $A_1$ and extending from the outer edges of the center section $A_1$ toward the outer edges of the excreta treatment sheet for animals 1 (more specifically, the outer edges $E_1$ in the first direction located at both ends in the first direction $D_1$ and the outer edges $E_2$ in the second direction located at both ends in the second direction $D_2$).

Figure 5:
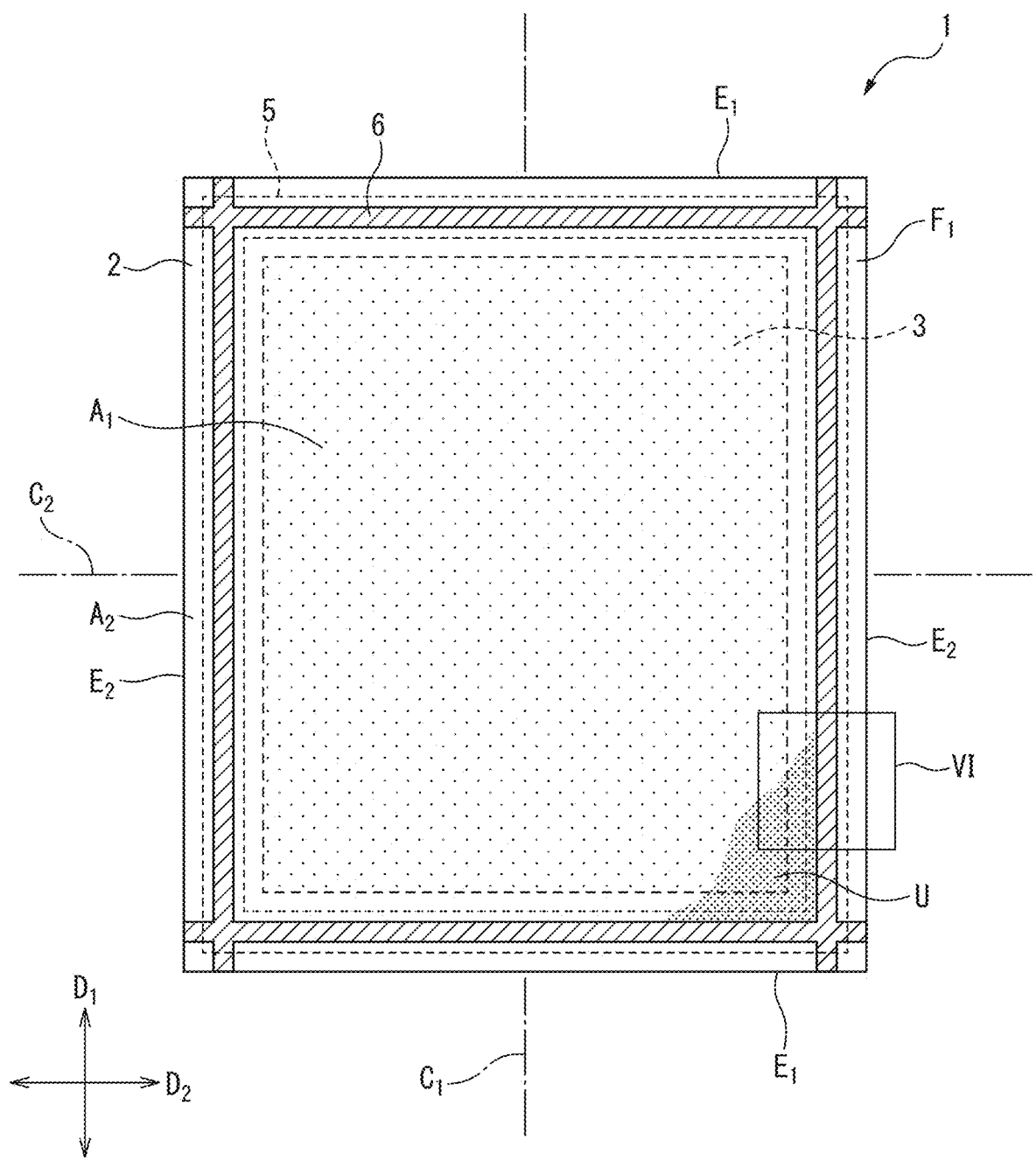
FIG. 5 is a plan view schematically showing the state after an animal has excreted urine U onto the excreta treatment sheet for animals 1 of FIG. 2.

For the first embodiment, as shown in FIGS. 1 to 4, at the outer peripheral sections $A_2$, the excreta treatment sheet for animals 1 comprises joining sections 5 extending in a manner enclosing the center section $A_1$, where the top sheet 2 and back sheet 4 are joined via an arbitrary adhesive such as a hot-melt adhesive, and water-blocking sections 6 extending so as to overlap with the joining sections 5 in the thickness direction T and exposed in a manner without protruding from the first surface $F_1$ of the excreta treatment sheet for animals 1. The water-blocking sections 6 of the first embodiment are composed of fused sections that are fused by the constituent fibers of the fiber structure forming the top sheet 2 being melted together. FIG. 5 is a plan view schematically showing the state after an animal has excreted urine U onto the excreta treatment sheet for animals 1 of FIG. 2, and FIG. 6 is an enlarged plan view of the main part of the excreta treatment sheet for animals 1 of FIG. 5 defined by the enclosing line VI.

Figure 6:
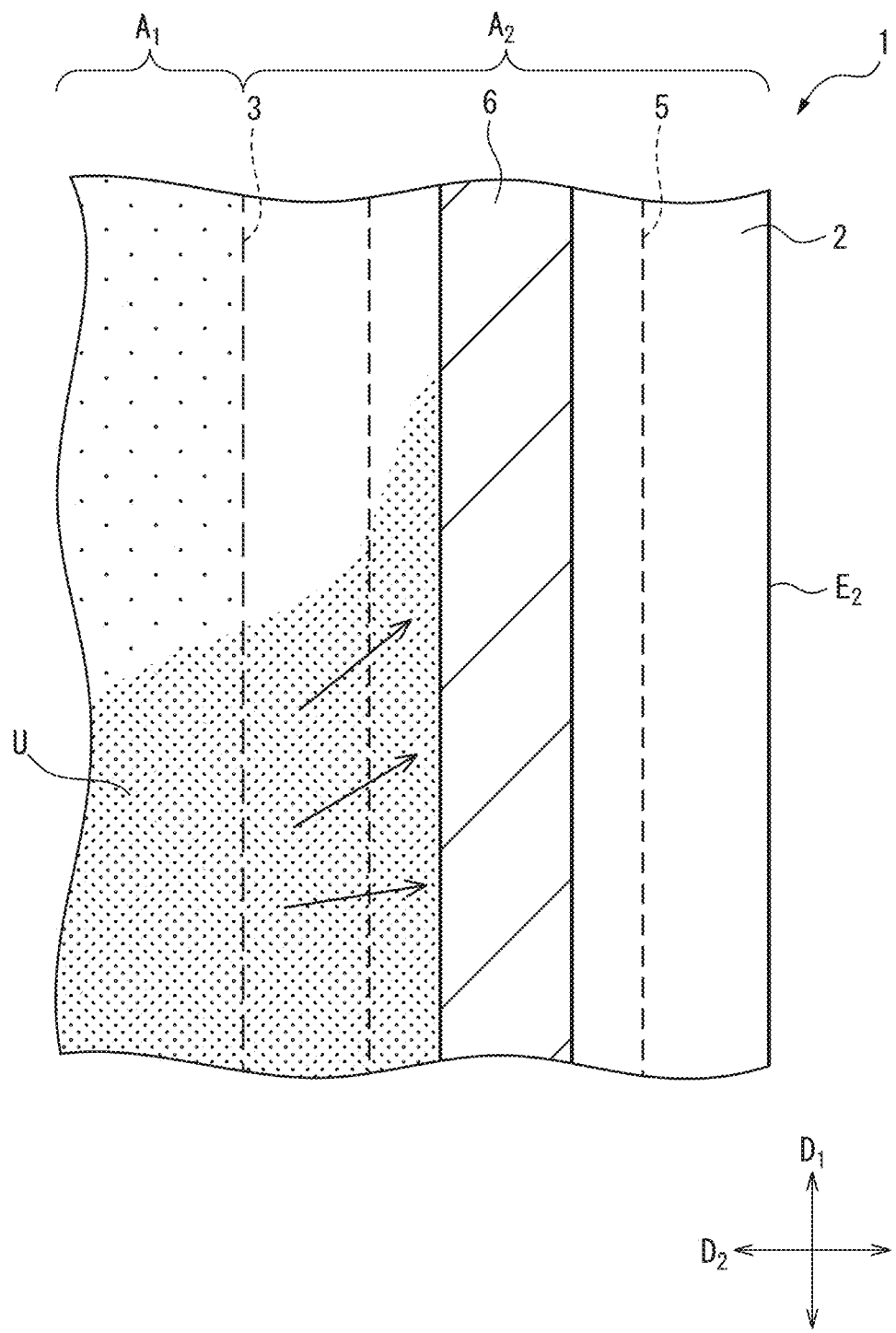
FIG. 6 is an enlarged plan view of the main part of the excreta treatment sheet for animals 1 of FIG. 5 defined by the enclosing line VI.

Since the excreta treatment sheet for animals 1 of the first embodiment thus comprises, at the outer peripheral sections $A_2$, joining sections 5 extending to surround the center section $A_1$ and having the top sheet 2 and back sheet 4 joined by an arbitrary adhesive, and water-blocking sections 6 extending so as to overlap with the joining sections 5 in the thickness direction T, and being exposed in a manner without protruding from the first surface $F_1$ of the excreta treatment sheet for animals 1, then as shown in FIG. 5 and FIG. 6, the joining sections 5 can adequately ensure bonding strength between the top sheet 2 and back sheet 4 while minimizing bleeding wherein urine U excreted into the excreta treatment sheet for animals 1 is transmitted inside the top sheet 2 and leaks outward in the in-plane direction, while the water-blocking sections 6 can minimize transmitted leakage whereby urine U excreted into the excreta treatment sheet for animals 1 is transmitted onto the surface of the top sheet 2 (i.e., onto the first surface $F_1$), and leaks outward in the in-plane direction.

Moreover, since the water-blocking sections 6 exhibit a water-blocking effect while exposed in a manner without protruding from the first surface $F_1$ of the excreta treatment sheet for animals 1, the excreta treatment sheet for animals 1 is unlikely to have reduced water-blocking action (i.e., it can adequately exhibit the function of the water-blocking sections) even when it is packed or tread on by an animal, and the aforementioned transmitted leakage can be stably minimized.

Thus, the excreta treatment sheet for animals 1 according to the first embodiment can adequately ensure bonding strength between the top sheet 2 and back sheet 4 while making it less likely for urine U excreted into the excreta treatment sheet for animals 1 to leak outward in the in-plane direction.

Incidentally, as shown in FIG. 1, the excreta treatment sheet for animals of the invention is set at a prescribed location of a rearing space for an animal such as a pet (for example, indoors) in the expanded state, so that the top sheet is situated on the excreta supply surface side, and used to absorb and hold excreta, such as urine, that have been excreted by an animal, in order to keep the rearing space in a clean condition. The excreta treatment sheet for animals of the invention may be set directly on the floor surface of the rearing space or on the ground outdoors, or it may be set via a prescribed holder, tray, mat or the like.

The "animal" to which the excreta treatment sheet for animals according to the invention is to be applied is not particularly restricted so long as it is an animal that can be reared, such as a pet, and it may be an animal such as a dog, cat or hamster. The "excreta" that are to be absorbed and held by the excreta treatment sheet for animals of the invention are not limited to urine, and for example, they may consist of any of various liquid to low-viscosity body fluids including oral liquids such as saliva, blood or low-viscosity feces. The explanation in the present description refers to urine for convenience.

Each of the members composing the excreta treatment sheet for animals of the invention will now be described in detail, using the excreta treatment sheet for animals 1 of the first embodiment.

Top Sheet

For the first embodiment described above, as shown in FIG. 1 and FIG. 2, the top sheet 2 used in the excreta treatment sheet for animals 1 is composed of a liquid-permeable sheet-like member that has, in the plan view, an essentially rectangular outer shape that is longitudinal with length in the first direction $D_1$, extending from the outer edge $E_1$ in the first direction on one side across to the outer edge $E_1$ in the first direction on the other side, in the first direction $D_1$ of the excreta treatment sheet for animals 1, while extending from the outer edge $E_2$ in the second direction on one side across to the outer edge $E_2$ in the second direction on the other side, in the second direction $D_2$, and that in the thickness direction T of the excreta treatment sheet for animals 1, is situated at a location where urine excreted by an animal is first received (i.e., a location on the supply surface side), and causes urine excreted by the animal to migrate from the supply surface to the absorbent body 3 that is situated on the non-supply surface side (setting surface side).

According to the invention, the liquid-permeable sheet-like member that may be used as the top sheet is not particularly restricted so long as it has the prescribed liquid permeability, and any desired sheet-like fiber structure, for example a nonwoven fabric such as an air-through nonwoven fabric, SMS nonwoven fabric (i.e., a spunbond/meltblown/spunbond layered nonwoven fabric), spunbond nonwoven fabric or point bond nonwoven fabric, or a woven fabric or knitted fabric; or a porous film formed by opening holes in a resin film, may be suitably used. The sheet-like fiber structure may also be subjected to hydrophilicizing treatment with a surfactant. From the viewpoint of liquid permeability, strength and flexibility, it is preferred to use a sheet-like fiber structure, and more preferred to use an air-through nonwoven fabric.

When a sheet-like fiber structure is used as the top sheet, the constituent fibers are not particularly restricted, and for example, they may be thermoplastic resin fibers made of a resin such as an olefin-based resin such as polyethylene or polypropylene or a polyester-based resin such as polyethylene terephthalate or polylactic acid, such resins being used either alone or two or more different types of resins being used in combination. The structures of thermoplastic resin fibers are not particularly restricted, and for example, composite fibers such as core-sheath fibers, or modified cross-section fibers, solid crimped fibers or the like may be used.

In addition, the thermoplastic resin fibers may be subjected to hydrophilicizing treatment, such as treatment utilizing a surfactant or hydrophilic agent (for example, kneading of a surfactant into the fibers, or coating of a surfactant onto the fiber surfaces), or they may include an optional additive such as a pigment, aromatic, deodorant or antimicrobial agent. Such additives may also be used in combinations of two or more different types.

According to the invention, the basis weight of the sheet-like member that may be used as the top sheet is not particularly restricted so long as it has the prescribed liquid permeability and strength, and it may be in the range of 6 g/m² to 30 g/m², for example, and preferably in the range of 15 g/m² to 25 g/m². If the basis weight of the sheet-like member is within this range it will have the prescribed strength as a top sheet, and will therefore be resistant to tearing when an animal such as a dog steps onto the excreta treatment sheet for animals, and when the sheet-like member is made of a fiber structure, since the interfiber distances between the constituent fibers are within the prescribed range, it more easily exhibits capillary movement whereby urine is caused to migrate from the supply surface side to the setting surface side of the top sheet. An additional advantage is that urine that has permeated the top sheet and been absorbed and held in the absorbent body will be less visible due to the compacted structure of the fibers of the top sheet.

The structure of the top sheet is not particularly restricted so long as it has the prescribed liquid permeability allowing it to be used as a top sheet, and the top sheet that is used may have an approximately flat structure as with the first embodiment, or it may have a protrusion-recess structure on the surface on the excreta supply surface side. In particular, since the top sheet having a protrusion-recess structure on the surface of the excreta supply surface side has excellent liquid permeability allowing urine to permeate in the thickness direction while the urine is unlikely to be transmitted to the surface of the top sheet, urine supplied to the first surface of the excreta treatment sheet for animals can be rapidly caused to migrate to the absorbent body, and outward leakage of urine in the in-plane direction can be made even less likely to occur.

The form of the protrusion-recess structure of the top sheet is not particularly restricted so long as it can promote migration of liquids such as urine, and for example it may be, in the plan view, a protrusion-recess structure composed of a plurality of straight linear elevated sections extending in a prescribed direction of the top sheet and aligned at prescribed intervals in the direction perpendicular to the prescribed direction, and a plurality of straight linear recessed grooves situated between adjacent elevated sections and extending parallel to the elevated sections, the internal structures of the elevated sections being either hollow or solid; a protrusion-recess structure comprising a plurality of arranged hemispherical or cylindrical raised sections on approximately flat bases; or a protrusion-recess structure having raised sections and recesses formed in an irregular manner across essentially the entire surface of the supply surface side of the top sheet. The means for forming such a protrusion-recess structure is not particularly restricted, and examples include a method of continuously blasting gas (for example, air) onto a fiber web, or any desired shaping method such as compression molding or gear stretching.

The dimensional shape and thickness of the sheet-like member that may be used as the top sheet is not particularly restricted so long as the sheet-like member can function as a top sheet for an excreta treatment sheet for animals, and any desired dimensional shape and thickness may be employed depending on the desired liquid permeability and strength.

Absorbent Body

For the first embodiment, as shown in FIG. 2, the absorbent body 3 to be used in the excreta treatment sheet for animals 1 is composed of an absorbing member that has, in the plan view, a quadrilateral outer shape that extends in a manner straddling in the first direction $D_1$ the center axis line $C_2$ running in the second direction of the excreta treatment sheet for animals 1, while extending in a manner straddling in the second direction $D_2$ the center axis line $C_1$ running in the first direction $D_1$, and that in the thickness direction T of the excreta treatment sheet for animals 1, is situated between the top sheet 2 and back sheet 4 and absorbs and holds urine that has passed through the top sheet 2. The top sheet 2 and the absorbent body 3 are joined by an optional adhesive such as a hot-melt adhesive, the adhesive being disposed between the top sheet 2 and the absorbent body 3 to a basis weight level that does not interfere with permeation of excreta (for example, 0.1 $g/m^2$ to 10 $g/m^2$), and in a coated state (for example, a film-like (curtain-coated), spiral, dotted or striped form).

The absorbent body 3 has an outer dimension that is somewhat smaller than the top sheet 2 and back sheet 4 in the plan view, and it is disposed in the center region of the excreta treatment sheet for animals 1 as explained above. If the absorbent body 3 is thus situated in the center region, the excreta treatment sheet for animals 1 will be delineated in the plan view into a center section $A_1$ as the portion where the top sheet 2, absorbent body 3 and back sheet 4 overlap in the thickness direction T, and outer peripheral sections $A_2$ that surround the center section $A_1$ and extend from the outer edges of the center section $A_1$ toward the outer edges of the excreta treatment sheet for animals 1.

Furthermore, as shown in FIG. 4, the absorbent body 3 comprises, in the thickness direction T, a hydrophilic colored sheet 31 located relatively on the supply surface side and colored with an optionally selected color such as blue, green, yellow or orange, an absorbent core 32 located relatively on the non-supply surface side and formed by an absorbent material for absorption and holding of excreta, and a core wrap sheet 33 composed of at least one liquid-permeable sheet, covering the colored sheet 31 and the absorbent core 32 from the non-supply surface side. As shown in FIG. 4, the absorbent core 32 also comprises, in the thickness direction T, a first absorbent core 321 situated relatively on the supply surface side and constructed of an absorbent polymer 321a, and a second absorbent core 322 situated relatively on the non-supply surface side and constructed of an absorbent polymer 322a and water-absorbent fibers 322b.

As shown in FIG. 4, the first absorbent core 321 is composed of a particulate absorbent polymer 321a disposed in a planar dispersed state between the colored sheet 31 and the second absorbent core 322, and the second absorbent core 322 is composed of a mixture of a particulate absorbent polymer 322a and water-absorbent fibers 322b, disposed in a planar dispersed state between the first absorbent core 321 and the core wrap sheet 33.

The absorbent polymer 321a composing the first absorbent core 321 and the absorbent polymer 322a composing the second absorbent core 322 may be the same absorbent polymer or different absorbent polymers. The absorbent polymer is not particularly restricted so long as it can absorb and hold excreta such as urine, and for example, any super-absorbent polymer such as polyacrylic acid-based (for example, sodium acrylate copolymer), starch-based or cellulosic, may be employed. The basis weight of the absorbent polymer is not particularly restricted; however, from the viewpoint of absorption properties, the basis weight of the absorbent polymer 321a composing the first absorbent core 321 is preferably in the range of 20 $g/m^2$ to 50 $g/m^2$, and the basis weight of the absorbent polymer 322a in the second absorbent core 322 is preferably in the range of 8 $g/m^2$ to 30 $g/m^2$.

The water-absorbent fibers in the second absorbent core 322 are not particularly restricted so long as they can absorb and hold excreta such as urine, and for example, cellulosic water-absorbent fibers such as pulp, including fluff pulp, or cotton may be used. The basis weight of the water-absorbent fibers in the first absorbent core is not particularly restricted; however, from the viewpoint of absorption properties it is preferably in the range of 30 $g/m^2$ to 115 $g/m^2$.

Since the excreta treatment sheet for animals 1 of the first embodiment has the absorbent core 32 of the absorbent body 3 composed of a first absorbent core 321 and a second absorbent core 322, urine that has permeated the top sheet 2 passes between the absorbent polymer 321a of the first absorbent core 321 by affinity of the water-absorbent fibers 322b in the second absorbent core 322, and is readily incorporated into the second absorbent core 322. Since this allows the excreta treatment sheet for animals 1 to rapidly absorb urine that has permeated the top sheet 2 into the absorbent body 3, the urine is unlikely to flow outward in the in-plane direction of the excreta treatment sheet for animals 1, and outward leakage of urine in the in-plane direction can be made less likely to occur.

In addition, with the excreta treatment sheet for animals 1 of the first embodiment, even when the animal has stepped on the first surface $F_1$ and the pressure applied by the foot of the animal has caused urine held between the water-absorbent fibers 322b present in the second absorbent core 322 to seep out, the seeped urine can be absorbed by the absorbent polymer 322a in the second absorbent core 322 and the absorbent polymer 321a of the first absorbent core 321 located on the supply surface side of the second absorbent core 322, making it unlikely that seepage of urine from the absorbent body 3 will occur.

Furthermore, since the absorbent body 3 of the excreta treatment sheet for animals 1 of the first embodiment includes the absorbent polymer 321a of the first absorbent core 321 and the absorbent polymer 322a and water-absorbent fibers 322b in the second absorbent core 322, as absorbent materials, the water capacity of the absorbent body as a whole increases, and excreta such as urine that have been excreted from an animal can be absorbed and held reliably for prolonged periods.

According to the invention, the absorbing member to be used as the absorbent body is not limited to that of the first embodiment so long as it can absorb and retain excreta such as urine, and any water absorbing member known in the relevant field may be used. The absorbing member may be an absorbing member with a two-layer structure comprising two layers of absorbent cores as in the first embodiment described above, or it may be an absorbing member with a single-layer structure comprising a single-layer absorbent core or a multilayer structure comprising an absorbent core of 3 or more layers.

For the first embodiment described above, the colored sheet 31 is composed of tissue paper colored with an optionally selected color such as blue, green, yellow or orange (for example, tissue paper with a basis weight of about 13.5 g/m$^2$, formed of Northern bleached Kraft pulp as the main material), and as shown in FIG. 4, it is disposed in the absorbent body 3 so as to cover the surface of the supply surface side of the absorbent core 32 (i.e., the top sheet side). The colored sheet 31 acts together with the core wrap sheet 33 to prevent deformation of the absorbent core 32, while mingling the color of urine absorbed in the absorbent core 32 with the color shade of the colored sheet 31 so that it is less apparent (i.e., excreta absorbed in the absorbent body 3 is less visible from the supply surface side).

For the first embodiment, incidentally, the colored sheet 31 and the absorbent core 32 are bonded by water spraying. The water spraying is bonding means in which water is sprayed onto the top surface of the absorbent core 32 (specifically, the first absorbent core 321 composed of the absorbent polymer 321a) (i.e., the surface of the excreta treatment sheet for animals on the supply surface side) during production of the absorbent body 3, and the colored sheet 31 is attached onto it. The water sprayed by the water spray is then evaporated off to leave the water-sprayed sections in a dry state, so that the colored sheet 31 and the absorbent core 32 (specifically, the first absorbent core 321 composed of the absorbent polymer 321a) are in a directly joined state without any other components such as adhesive components intervening. When the colored sheet 31 and absorbent core 32 are bonded by water spraying in this manner, the urine that has permeated the top sheet can be rapidly absorbed into the absorbent core 32 without other components such as adhesive components intervening between the colored sheet 31 and absorbent core 32, and therefore urine is unlikely to flow outward in the in-plane direction of the excreta treatment sheet for animals, and outward leakage of urine in the in-plane direction can be made even less likely to occur.

For the first embodiment, the entire colored sheet 31 is colored with an optionally selected color; however, the present invention is not restricted to this aspect, and the colored sheet may be only partially colored. Moreover, the form of coloration of the colored sheet is not particularly restricted, and the colored sheet may be colored with a single color shade or with a plurality of different color shades, while it may also be colored in any desired form such as a pattern, design or characters accompanying the prescribed color shade. Such a colored sheet can be obtained by coloring a non-colored base sheet (for example, a nonwoven fabric such as tissue paper or an air-through nonwoven fabric), using any desired coloring means such as dyeing or printing.

For the first embodiment, the core wrap sheet 33 is composed of similar tissue paper as the colored sheet 31 described above (for example, tissue paper with a basis weight of 13.0 g/m$^2$ to 13.5 g/m$^2$, formed using Northern bleached Kraft pulp as the main starting material), and as shown in FIG. 4, it is disposed in the absorbent body 3 so as to cover the colored sheet 31 and absorbent core 32 from the non-supply surface side (i.e., the back sheet side). By providing such a core wrap sheet 33, the excreta treatment sheet for animals 1 will be unlikely to have deformation of the absorbent core 32 or positional shifting of the colored sheet 31.

According to the invention, the core wrap sheet is not particularly restricted so long as it has liquid permeability and can prevent deformation of the absorbent core, and any desired nonwoven fabric such as an air-through nonwoven fabric or spunbond nonwoven fabric, for example, may be used instead of the aforementioned tissue paper.

Moreover, while the absorbent body 3 of the first embodiment has a quadrilateral outer shape plan view, as shown in FIG. 1 and FIG. 2, there is no limitation to this aspect for the invention, and the absorbent body may have a planar shape other than quadrilateral, such as circular or elliptical. Furthermore, the location where the absorbent body is disposed for the invention is not particularly restricted so long as the excreta treatment sheet for animals can be delineated into the center section and outer peripheral section, and the absorbent body may be disposed with a certain degree of bias in one desired direction with respect to the center of the excreta treatment sheet for animals, in the plan view.

The outer dimensions, thickness and basis weight of the absorbing member to be used as the absorbent body is not particularly restricted so long as the absorbing member can function as an absorbent body for an excreta treatment sheet for animals, and any desired outer dimensions, thickness and basis weight may be employed depending on the size and species of the animal to which the excreta treatment sheet for animals is to be applied.

Back Sheet

For the first embodiment described above, the back sheet 4 used in the excreta treatment sheet for animals 1 is composed of a liquid-impermeable sheet-like member that has, in the plan view, an essentially rectangular outer shape that is longitudinal with length in the first direction $D_1$, extending from the outer edge $E_1$ in the first direction on one side across to the outer edge $E_1$ in the first direction on the other side, in the first direction $D_1$ of the excreta treatment sheet for animals 1, while extending from the outer edge $E_2$ in the second direction on one side across to the outer edge $E_2$ in the second direction on the other side, in the second direction $D_2$, and that in the thickness direction T of the excreta treatment sheet for animals 1, is situated at a location facing the floor surface or ground on which the excreta treatment sheet for animals 1 is set (i.e., a location on the non-supply surface side), and functions to prevent leakage of urine that has been absorbed and held in the excreta treatment sheet for animals 1.

According to the invention, the liquid-impermeable sheet-like member that may be used as the back sheet is not particularly restricted so long as it has the prescribed liquid impermeability as a liquid-impermeable sheet-like member, and for example, a resin film formed from polyethylene, polypropylene, polyethylene terephthalate or the like, a laminate of a nonwoven fabric attached to such a resin film, a laminated resin film obtained by laminating different resin films together (for example, a polyethylene/polypropylene laminated film), or a water-repellent or hydrophobic non-woven fabric, may be suitably used.

In addition, the basis weight of the sheet-like member that may be used as the back sheet is not particularly restricted so long as it has the prescribed liquid impermeability and strength, and it may be in the range of 5 g/m$^2$ to 30 g/m$^2$, for example, and preferably in the range of 15 g/m$^2$ to 20 g/m$^2$.

Furthermore, the back sheet, similar to the top sheet described above, is one with an outer shape and dimensions capable of covering the absorbent body from the non-supply surface side, and for the first embodiment, the back sheet 4 has approximately the same outer shape and dimensions as the top sheet 2 in the plan view. The dimensional shape and thickness of the sheet-like member that may be used as the back sheet is not particularly restricted so long as the sheet-like member can function as a back sheet for an excreta treatment sheet for animals, and any desired dimensional shape and thickness may be employed depending on the desired liquid impermeability and strength.

Joining Sections

Moreover, as shown in FIGS. 1 to 4, the excreta treatment sheet for animals 1 of the first embodiment comprises, at the outer peripheral sections A$_2$, joining sections 5 extending in a manner enclosing the center section A$_1$, where the top sheet 2 and back sheet 4 are joined via an arbitrary adhesive such as a hot-melt adhesive. Since the adhesive in the joining sections 5 infiltrates to a certain degree in the thickness direction from the surface of at least the non-supply surface side of the top sheet 2, entering between the constituent fibers of the top sheet 2 and hardening, it is possible to ensure adequate bonding strength between the top sheet 2 and back sheet 4, while also minimizing bleeding that occurs when urine excreted onto the supply surface and urine leaked from the absorbent body are transmitted into the top sheet 2 and leak outward in the in-plane direction, and making urine unlikely to leak outward in the in-plane direction of the excreta treatment sheet for animals 1.

The coating amount and coating form of the adhesive used in the joining sections of the invention are not particularly restricted so long as they do not inhibit the effect of the invention, and any coating amount (for example, 0.1 g/m$^2$ to 10 g/m$^2$) and coating form (for example, one or more straight lines, belt shapes, spiral shapes, omega shapes or zigzag shapes) may be employed.

Water-Blocking Sections

As shown in FIGS. 1 to 4, the excreta treatment sheet for animals 1 of the first embodiment also comprises, at the outer peripheral sections A$_2$, water-blocking sections 6 that extend in a manner overlapping with the joining sections 5 in the thickness direction T and that are exposed in a manner without protruding from the first surface F$_1$ of the excreta treatment sheet for animals 1. The water-blocking sections 6 of the first embodiment are composed of fused sections that are fused by the constituent fibers of the fiber structure forming the top sheet 2 being melted together.

By comprising such water-blocking sections 6 in the excreta treatment sheet for animals 1, as shown in FIG. 5 and FIG. 6, even when urine excreted onto the supply surface has flowed through the surface of the top sheet 2 (i.e., on the first surface F$_1$), it is possible to halt that flow (more specifically, urine that has flowed in the water-blocking sections 6 is unlikely to flow at the water-blocking sections 6 in the direction transversing the water-blocking sections 6), and transmitted leakage, whereby urine leaks outward in the in-plane direction of the excreta treatment sheet for animals 1, can be minimized.

Moreover, since such water-blocking sections 6 exhibit a water-blocking effect while exposed in a manner without protruding from the first surface F$_1$ of the excreta treatment sheet for animals 1, the excreta treatment sheet for animals 1 is unlikely to have a reduced water-blocking effect of the water-blocking sections 6 even when it is packed or tread on by an animal, and the aforementioned transmitted leakage can be stably minimized.

Incidentally, while the water-blocking sections 6 of the first embodiment has its portions that overlap with the joining sections 5 in the thickness direction T extending so as to surround the center section A$_1$, as shown in FIG. 2, there is no limitation to this aspect for the invention, and for example, when it has portions where animal urine is unlikely to leak outward in the in-plane direction, due to the habits of the animal for which the excreta treatment sheet for animals of the invention is applied, or the arrangement of the excreta treatment sheet for animals (for example, if it is to be placed on the floor surface along a wall face), then the water-blocking sections may be disposed only at portions where urine may leak outward in the in-plane direction (i.e., so that only some of the joining sections overlap in the thickness direction), instead of being arranged at all of the portions.

According to the invention, the means for forming the water-blocking sections that are exposed without protruding from the first surface of the excreta treatment sheet for animals is not particularly restricted so long as it allows portions with a water-blocking effect to be formed, and they may be formed, for example, using heat welding means such as a heat sealer, or ultrasonic welding means, to at least partially fuse prescribed portions on the top sheet. In this case, the water-blocking sections are composed of portions where the top sheet is melted (melted portions). When the top sheet is composed of a sheet-like fiber structure (such as a nonwoven fabric) as in the first embodiment, it can be formed by fusing together the constituent fibers, in a state with the constituent fibers completely melted or partially melted at the prescribed portions of the fiber structure forming the top sheet. In this case, the water-blocking sections are composed of fused sections that have been fused by melting together of the constituent fibers of the fiber structure forming the top sheet, or semi-fused sections where the constituent fibers of the fiber structure have been partially melted. If the water-blocking sections are formed of such fused sections or semi-fused sections, then the water-blocking sections will be recesses that are slightly depressed from the first surface of the excreta treatment sheet for animals, due to reduction in the voids between the constituent fibers.

In addition, the water-blocking sections that are exposed without protruding from the first surface of the excreta treatment sheet for animals of the invention may also be formed by coating a water-repellent agent onto prescribed portions of the surface on the supply surface side of the top sheet, as in the embodiments described below. In this case, the water-blocking sections are composed of a water-repellent coating film of the water-repellent agent.

As shown in FIG. 2, the water-blocking sections 6 of the first embodiment are disposed continuously on the outer sides (i.e. the outer peripheral sections $A_2$) in the in-plane direction of the absorbent body 3 situated in the center section $A_1$ of the excreta treatment sheet for animals 1, along the outer edges of the excreta treatment sheet for animals 1 (more specifically, along the outer edges $E_1$ in the first direction located at both ends in the first direction $D_1$ and the outer edges $E_2$ in the second direction located at both ends in the second direction $D_2$), so as to surround the absorbent body 3 that has a quadrilateral outer shape extending in the first direction $D_1$ and second direction $D_2$. According to the invention, the arrangement of the water-blocking sections is not limited to the aspect of the first embodiment described above so long as it allows the water-blocking effect of the water-blocking sections to be exhibited, and the water-blocking sections may be arranged in any desired manner, although preferably the water-blocking sections are disposed so as to overlap with the absorbent body that has a quadrilateral outer shape, in either or both the first direction and second direction. If the water-blocking sections are disposed in this manner, then the water-blocking sections and the joining sections overlapping with the water-blocking sections in the thickness direction will overlap with the absorbent body in either or both the first direction and second direction, and it will therefore become easier to inhibit transmitted leakage especially of urine excreted into the center section of the excreta treatment sheet for animals, and also easier to inhibit bleeding of urine leaked from the absorbent body.

For the purpose of the present description, overlapping of the water-blocking sections with the absorbent body in a prescribed direction (for example, the first direction) means that when the outer shape of the absorbent body is projected in the prescribed direction in the plan view, the water-blocking sections are present within the projected range of the absorbent body (or in other words, the water-blocking sections are present between two imaginary straight lines running through the edges of the outer shape of the absorbent body in another direction (for example, the second direction) that is perpendicular to the prescribed direction, and extending in the prescribed direction.

Also, if the water-blocking sections extend continuously along either or both the first direction and the second direction, it will be possible to shut off flow channels of urine flowing in the direction crossing with the direction in which the water-blocking sections extend (i.e., the direction transversing the water-blocking sections), thus making it even less likely for outward leakage of urine to occur in the in-plane direction of the excreta treatment sheet for animals.

Furthermore, if the water-blocking sections are composed of fused sections of the constituent fibers of the fiber structure forming the top sheet, as in the first embodiment, then urine will be less likely to pass through the fused sections that lack gaps with reduced hydrophilicity due to melting, and it will be possible to exhibit a more excellent water-blocking effect at the water-blocking sections. In addition, because the top sheet and back sheet can be joined by higher bonding strength, since not only the adhesive at the joining sections but also the fused sections at the water-blocking sections contribute to joining between the top sheet and back sheet, it is possible for urine leaked from the absorbent body to be more reliably made unlikely to leak outward in the in-plane direction. Furthermore, since the water-blocking sections composed of the fused sections have different coloration than the periphery and are readily visible, an advantage is provided in that the owner of the animal can easily see the water-blocking sections, allowing the excreta treatment sheet for animals of the invention to provide the owner with a feeling of assurance that the excreta treatment sheet for animals is unlikely to leak urine to the outside.

For the purpose of the invention, "fused sections" means portions where the constituent material (for example, the constituent fibers of the fiber structure) have been completely melted by heat or the like and then cooled to hardness, while "semi-fused sections" means portions where the constituent material has been partially melted by heating or the like (for example, melting only of the surface sections of the constituent fibers of the fiber structure) and then cooled to hardness. Therefore, the fused sections of the fiber structure are composed of integrated masses resulting from melting and hardening of multiple constituent fibers, where the filamentous structure of the constituent fibers is not supported. On the other hand, semi-fused sections of the fiber structure maintain the filamentous structures of the constituent fibers while only the surface sections of the constituent fibers are melted, forming a fiber structure with multiple constituent fibers fused together.

According to the invention, the water-blocking sections may be composed of integrated parts where the top sheet, adhesive and back sheet have been integrated in the thickness direction at the outer peripheral sections of the excreta treatment sheet for animals, by any desired compressing means such as embossing. If the water-blocking sections are composed of such integrated parts, then gaps that can serve as flow channels for urine will be less likely to form at the water-blocking sections, from the supply surface of the top sheet up to the non-supply surface of the back sheet, and the water-blocking sections will be able to more reliably shut off flow channels of urine flowing outward in the in-plane direction of the excreta treatment sheet for animals. In addition, if the water-blocking sections are constructed by such integrated parts, then it is possible to join the top sheet and back sheet with higher bonding strength, the top sheet and back sheet are less likely to separate, and urine leaked from the absorbent body will be unlikely to leak out for a prolonged period of time.

Figure 7:
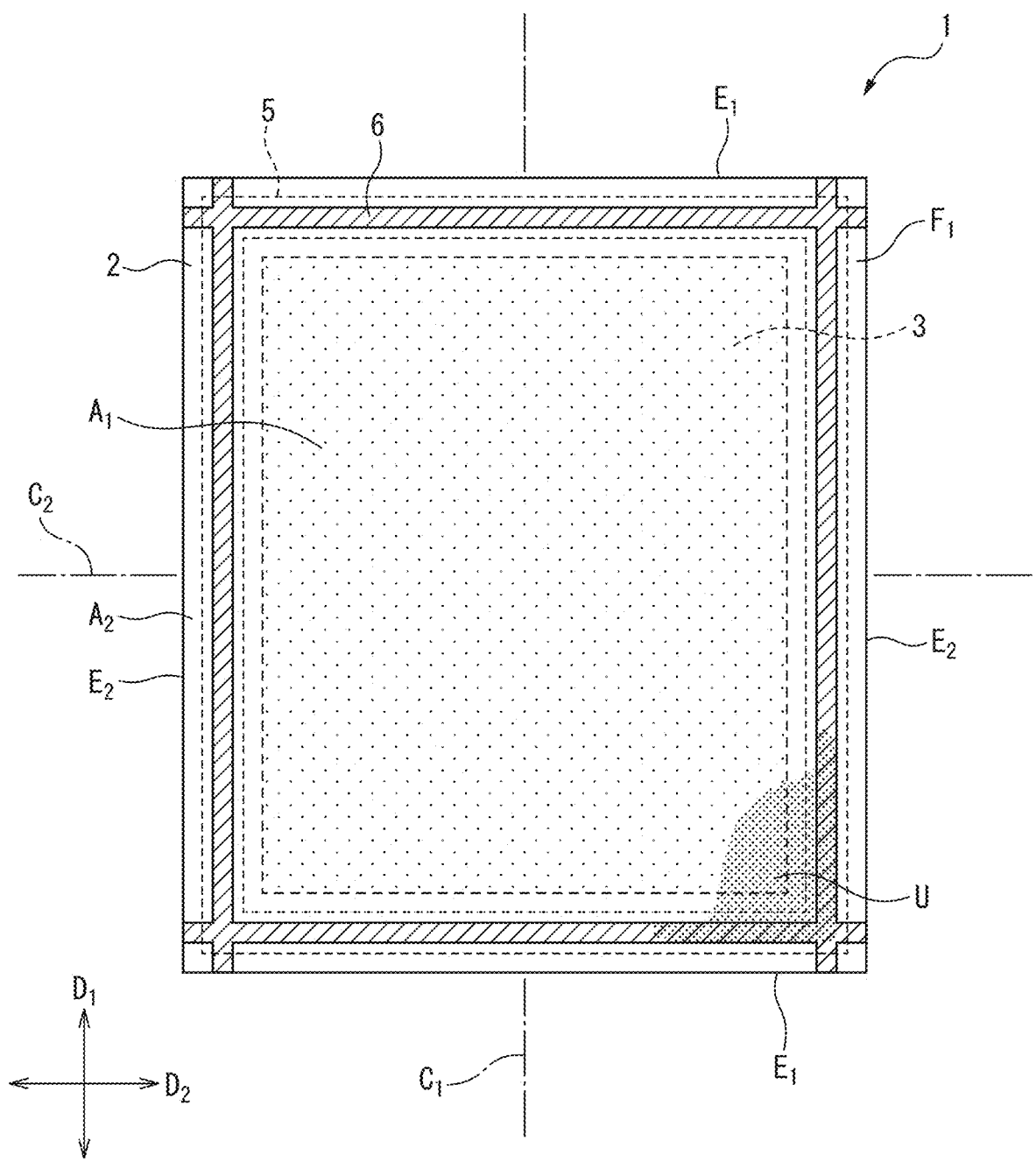
FIG. 7 is a plan view schematically showing the state after an animal has excreted urine U on an excreta treatment sheet for animals 1 wherein the water-blocking sections 6 are composed of semi-fused sections.

As mentioned above, the water-blocking sections of the invention may be composed of semi-fused sections where the constituent fibers are fused together, with partial melting of the constituent fibers at prescribed portions of the sheet-like fiber structure forming the top sheet. FIG. 7 is a plan view schematically showing the state after an animal has excreted urine U on an excreta treatment sheet for animals 1 wherein the water-blocking sections 6 are composed of semi-fused sections (corresponding to a modified example of the excreta treatment sheet for animals 1 of the first embodiment, having the same construction as the first embodiment except that the water-blocking sections 6 are composed of semi-fused sections). If the water-blocking sections 6 are composed of semi-fused sections, then as shown in FIG. 7, urine U that has reached the water-blocking sections 6 can be drawn in between the fused constituent fibers due to capillary movement by the fiber structures of the semi-fused sections, while being diffused along the direction in which the water-blocking sections 6 extend. Thus, even when excreted urine exceeds a certain quantity, the excreta treatment sheet for animals provided with such water-blocking sections can diffuse urine at the water-blocking sections in the direction in which the water-blocking sections extend, making it unlikely to leak outward in the in-plane direction. Furthermore, if the water-blocking sections are composed of such semi-fused sections, then the top sheet and back sheet can be joined by higher bonding strength since not only the adhesive at the joining sections but also the semi-fused sections contribute to a certain extent to joining between the top sheet and back sheet, so that it is possible for urine leaked from the absorbent body to be more reliably rendered unlikely to leak outward in the in-plane direction.

Furthermore, since the water-blocking sections composed of the semi-fused sections have different coloration than the periphery and are readily visible, an advantage is provided in that the owner of the animal can easily see the water-blocking sections, allowing the excreta treatment sheet for animals of the invention to provide the owner with a feeling of assurance that the excreta treatment sheet for animals is unlikely to leak urine to the outside.

In the first embodiment described above, the water-blocking sections 6 are disposed in a manner with straight linear water-blocking sections extending in the first direction $D_1$ and straight linear water-blocking sections extending in the second direction $D_2$ combined in a lattice fashion in the plan view; however, the manner of arrangement of the water-blocking sections for the invention is not particularly restricted so long as the effect of the invention is not inhibited, and for example, the water-blocking sections may be arranged in a straight linear, dashed line, zigzag or broken line fashion extending in either or both the first direction and second direction, or a combination thereof (for example, a lattice, quadrilateral, L-shaped or parallel-line fashion enclosing the absorbent body in the plan view), or they may be arranged in multiple lines aligned in the direction perpendicular to the direction in which the water-blocking sections extend.

Additional embodiments of the invention (second embodiment and third embodiment), differing from the first embodiment described above only in the aspect of the water-blocking sections, will now be described with reference to the accompanying drawings. The aspects of the construction other than the parts differing from the first embodiment are basically the same as the construction for the first embodiment, and therefore they will not be explained here.

Second Embodiment

Figure 8:
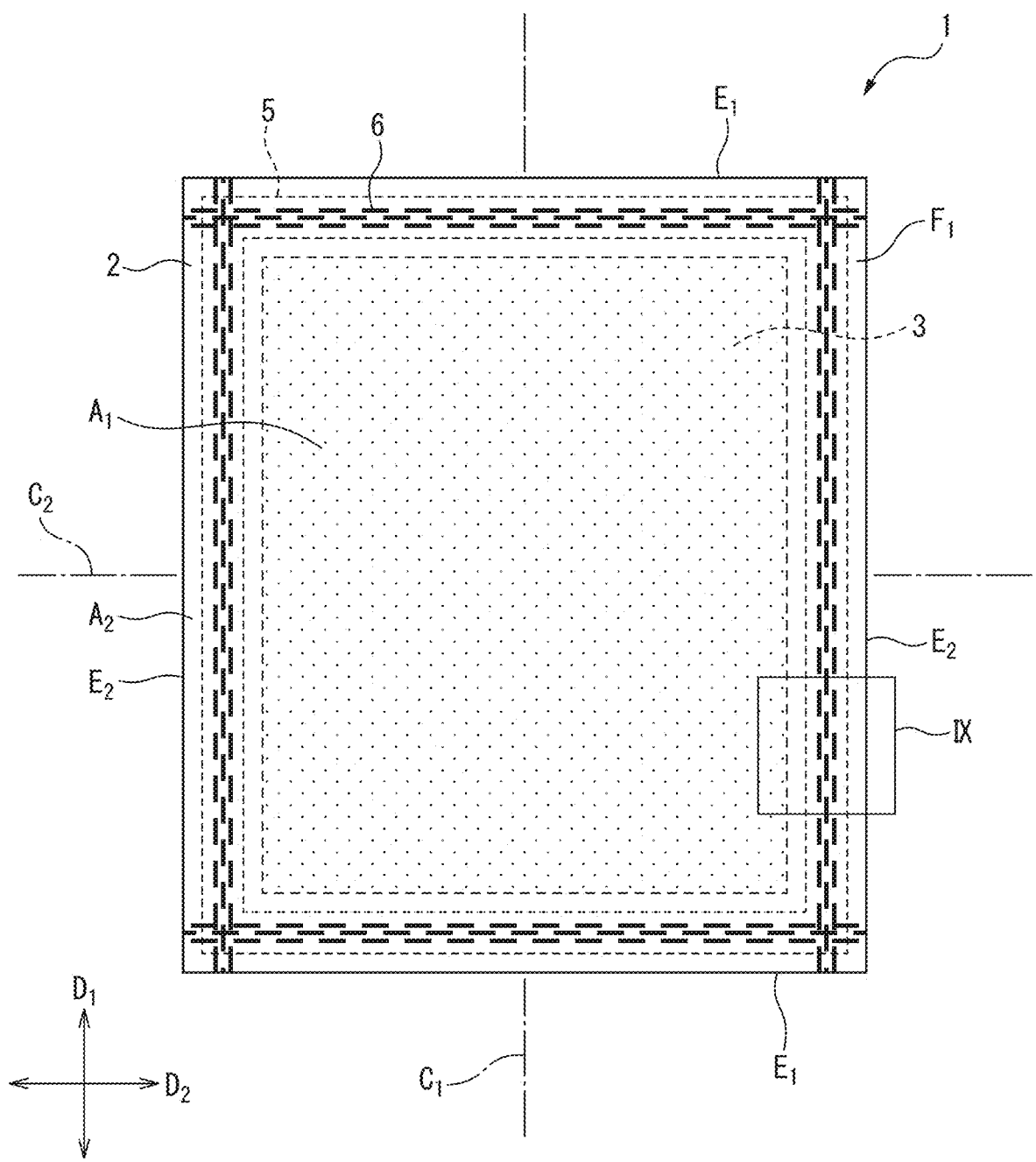
FIG. 8 is a plan view of an excreta treatment sheet for animals 1 according to a second embodiment of the invention, as viewed in the thickness direction from the top sheet 2 side, in the expanded state.
Figure 9:
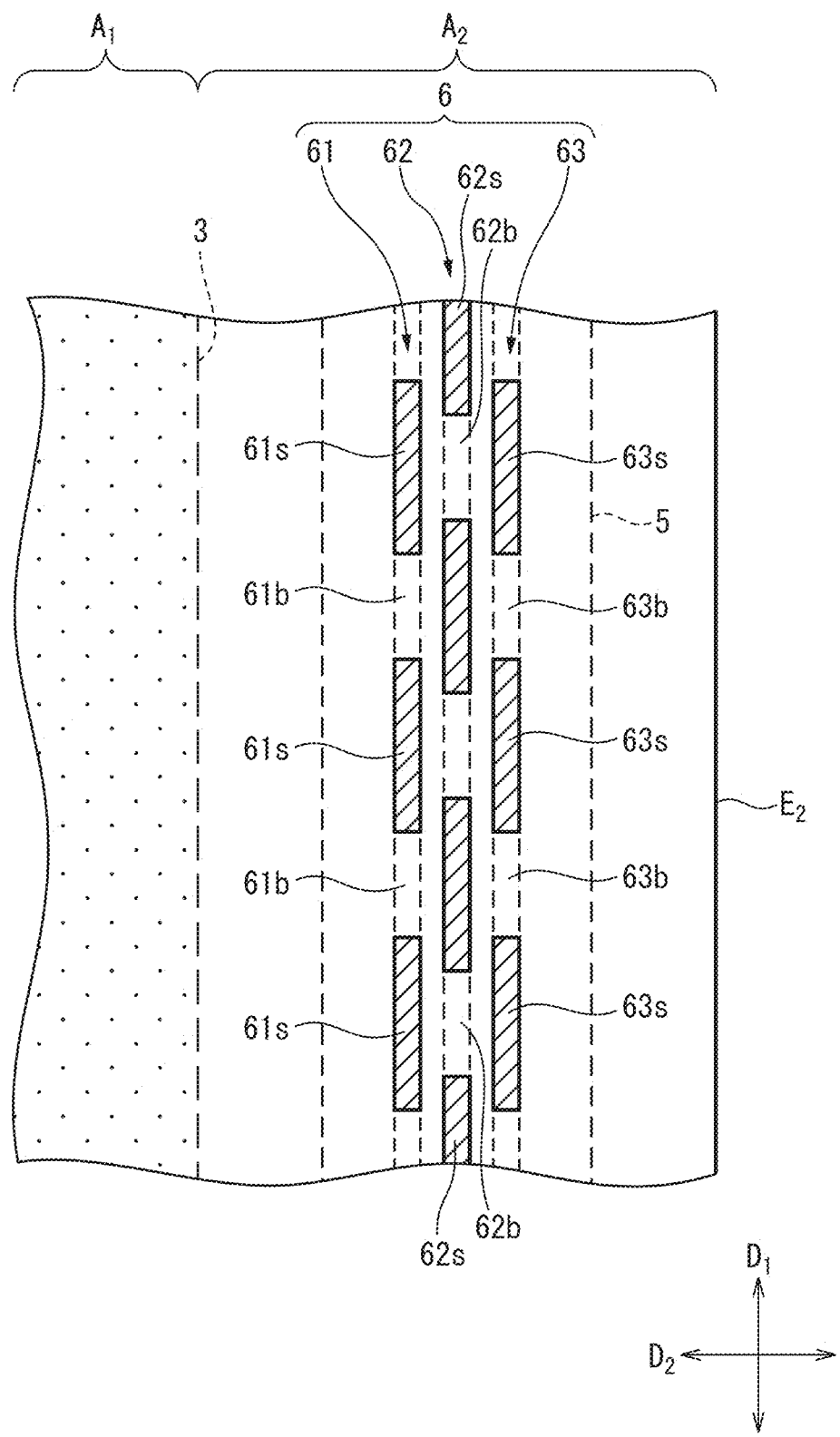
FIG. 9 is an enlarged plan view of the main part of the excreta treatment sheet for animals 1 of FIG. 8 defined by the enclosing line IX.
Figure 10:
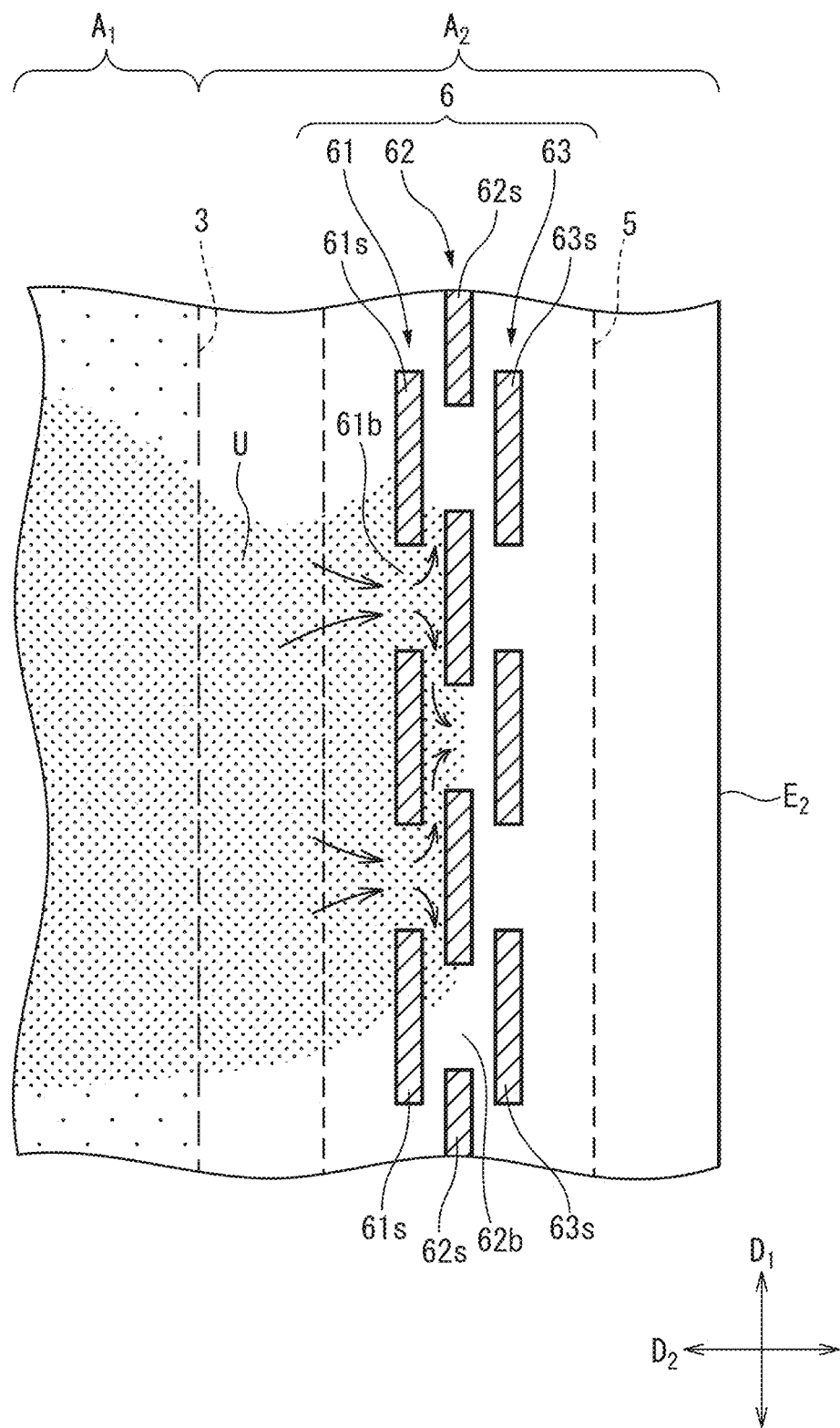
FIG. 10 is an enlarged plan view schematically showing the state after an animal has excreted urine U onto the excreta treatment sheet for animals 1 of FIG. 9.

FIG. 8 is a plan view of an excreta treatment sheet for animals 1 according to a second embodiment of the invention, as viewed in the thickness direction from the top sheet 2 side, in the expanded state, and FIG. 9 is an enlarged plan view of the main part of the excreta treatment sheet for animals 1 of FIG. 8 defined by the enclosing line IX. FIG. 10 is an enlarged plan view schematically showing the state after an animal has excreted urine U onto the excreta treatment sheet for animals 1 of FIG. 9.

According to the second embodiment, as shown in FIG. 8 and FIG. 9, the water-blocking sections 6 include a first water-blocking section 61 extending intermittently along the first direction $D_1$ and the second direction $D_2$, the first water-blocking section 61 being situated so that first water-blocking subdivisions 61s and first intermittent sections 61b are alternately aligned, and a second water-blocking section 62 extending intermittently along the direction parallel to the direction in which the first water-blocking section 61 extends, on the outer side in the direction perpendicular to the direction in which the first water-blocking section 61 extends, the second water-blocking section 62 being situated so that second water-blocking subdivisions 62s and second intermittent sections 62b are alternately aligned, as well as a third water-blocking section 63 extending intermittently along the direction parallel to the direction in which the second water-blocking section 62 extend, on the outer side in the direction perpendicular to the direction in which the second water-blocking section 62 extends, the third water-blocking section 63 being situated so that third water-blocking subdivisions 63s and third intermittent sections 63b are alternately aligned, the arrangement being such that the second water-blocking subdivisions 62s overlap with the first intermittent sections 61b and each of the facing ends of the adjacent two first water-blocking subdivisions 61s sandwiching the first intermittent sections 61b, in the direction perpendicular to the direction in which the first water-blocking section 61 extends, and the third water-blocking subdivisions 63s overlap with the second intermittent sections 62b and each of the facing ends of the adjacent two second water-blocking subdivisions 62s sandwiching the second intermittent sections 62b, in the direction perpendicular to the direction in which the second water-blocking section 62 extends.

Since the water-blocking sections 6 of the excreta treatment sheet for animals 1 of the second embodiment have a first water-blocking section 61 and a second water-blocking section 62 situated in the aforementioned specified arrangement, then when urine U flowing in the direction transversing the water-blocking sections 6 has passed through the first intermittent sections 61b of the first water-blocking section 61 and reached the second water-blocking section 62, as shown in FIG. 10, the urine U can be blocked by the second water-blocking subdivisions 62s of the second water-blocking section 62 while being diffused along the direction in which the water-blocking sections 6 extend. Thus, even when excreted urine U exceeds a certain quantity, the excreta treatment sheet for animals 1 of the second embodiment can diffuse the urine U at the water-blocking sections 6 in the direction in which the water-blocking sections 6 extend, making it unlikely to leak outward in the in-plane direction.

Incidentally, since the water-blocking sections 6 of the second embodiment also have a third water-blocking section 63 situated in the aforementioned specified arrangement, then even when urine U flowing in the direction transversing the water-blocking sections 6 has passed through the second intermittent sections 62b of the second water-blocking section 62 and reached the third water-blocking section 63, as shown in FIG. 10, the urine U can be blocked by the third water-blocking subdivisions 63s of the third water-blocking section 63 while being diffused along the direction in which the water-blocking sections 6 extend, and the urine U can be reliably made even less likely to leak outward in the in-plane direction.

Incidentally, while the water-blocking sections 6 of the second embodiment are constructed so as to have the first water-blocking section 61, second water-blocking section 62 and third water-blocking section 63 disposed in the specified arrangement, the water-blocking sections are not limited to such a construction for the invention, and the water-blocking sections may lack the third water-blocking section, or they may also have a fourth or additional water-blocking sections on the outer side of the third water-blocking section. If the water-blocking sections include fourth or additional water-blocking sections, this will particularly allow urine flowing in the direction transversing the water-blocking sections to be made even less likely to leak outward in the in-plane direction.

Furthermore, the water-blocking sections 6 (specifically the first water-blocking section 61, second water-blocking section 62 and third water-blocking section 63) for the second embodiment are disposed so as to extend intermittently along the first direction $D_1$ and second direction $D_2$; however, there is no limitation to this aspect for the invention, and the water-blocking sections may be disposed so as to extend intermittently along only either one of the first direction and second direction, depending on the urine flow direction and the locations more prone to leakage.

Third Embodiment

Figure 11:
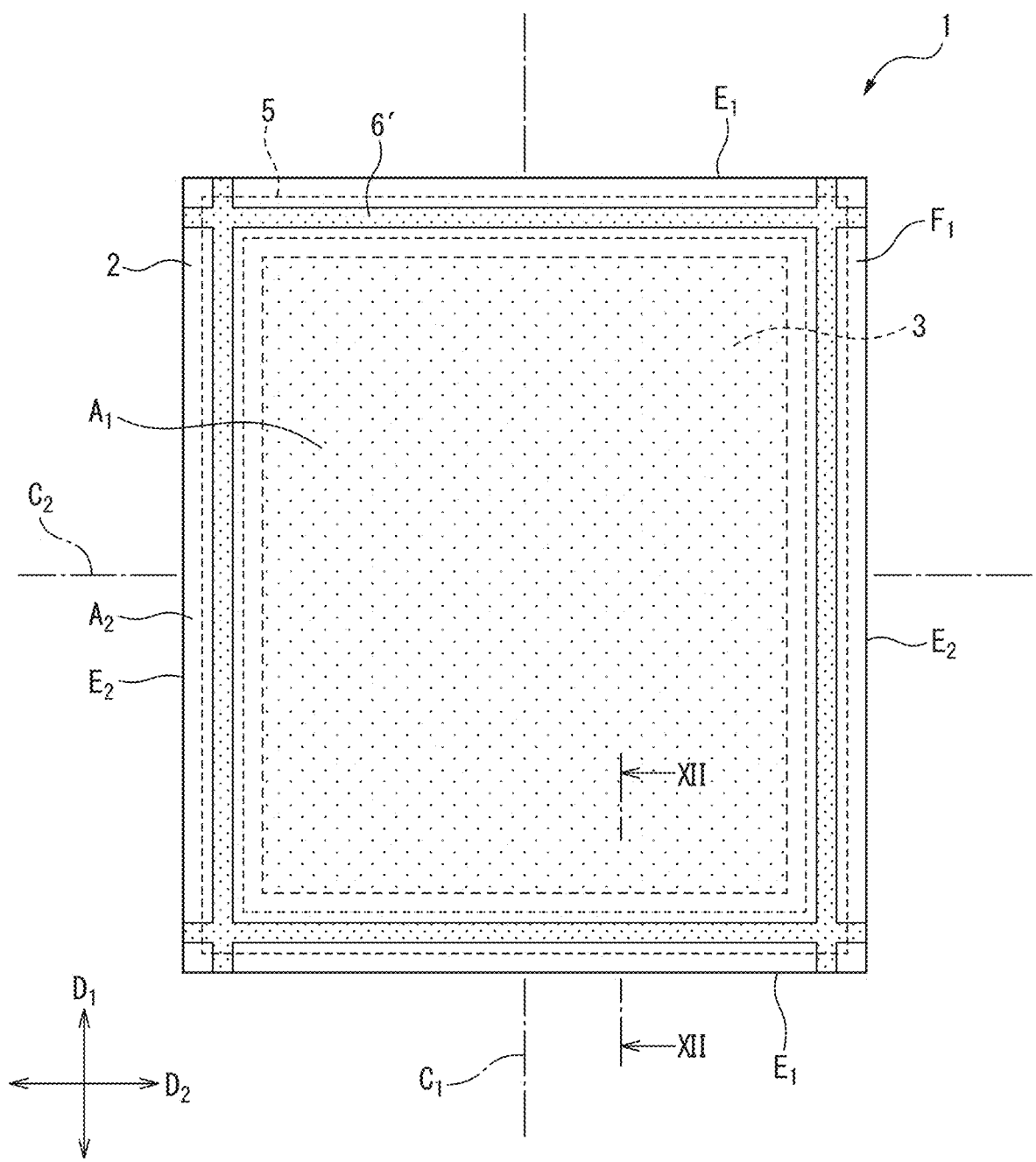
FIG. 11 is a plan view of an excreta treatment sheet for animals 1 according to a third embodiment of the invention, as viewed in the thickness direction from the top sheet 2 side, in the expanded state.

FIG. 11 is a plan view of an excreta treatment sheet for animals 1 according to a third embodiment of the invention, as viewed in the thickness direction from the top sheet 2 side, in the expanded state, and FIG. 12 is a partial cross-sectional view of the excreta treatment sheet for animals 1 of FIG. 11, along line XII-XII.

For the third embodiment, as shown in FIGS. 11 and 12, the water-blocking sections 6' are composed of a water-repellent coating film at the outer peripheral sections $A_2$, extending in a manner overlapping with the joining sections 5 in the thickness direction T and exposed in a manner without protruding from the first surface $F_1$ of the excreta treatment sheet for animals 1. The water-repellent coating film is formed at the outer peripheral sections $A_2$ by coating an arbitrary water-repellent agent such as a silicon-based water-repellent agent onto the surface on the supply surface side of the top sheet 2, the arrangement of the water-repellent coating film being the same as the first embodiment, as shown in FIG. 11.

Since the water-blocking sections 6' of the excreta treatment sheet for animals 1 of the third embodiment are composed of a water-repellent coating film, the water-repellent coating film can repel urine that has flowed in the direction transversing the water-blocking sections 6', so that an excellent water-blocking effect can be exhibited. Furthermore, since the water-repellent coating film that has repelled urine is readily visible, the owner of the animal can easily see the water-blocking sections 6' composed of the water-repellent coating film, allowing the excreta treatment sheet for animals 1 comprising the water-blocking sections 6' to provide the owner with a feeling of assurance that the excreta treatment sheet for animals is unlikely to leak urine to the outside.

Incidentally, the degree of water-repellency of the water-repellent coating film must be a degree of water-repellency allowing the water-repellent coating film to function as water-blocking sections, and for example, it may be a degree of water-repellency such that, when water has dropped onto the surface of the water-repellent coating film, the dropped water is repelled by the surface of the water-repellent coating film, forming water droplets.

According to the invention, the type of water-repellent agent and the coating amount are not particularly restricted so long as the water-repellent coating film formed by the water-repellent agent can function as water-blocking sections in the excreta treatment sheet for animals, and any type and coating amount may be employed depending on the desired water-blocking effect.

The water-repellent agent may also include desired added components such as pigments and aromatics, in a range that does not inhibit the effect of the invention. For example, if the water-repellent agent includes a pigment such as edible red coloring, the colored water-repellent coating film formed by the water-repellent agent will be readily visible even before urine has been supplied to the excreta treatment sheet for animals, and therefore the owner of the animal can easily see the water-blocking sections composed of the water-repellent coating film, allowing the excreta treatment sheet for animals comprising the water-blocking sections to provide the owner with a feeling of assurance that the excreta treatment sheet for animals is unlikely to leak urine to the outside.

The excreta treatment sheet for animals of the invention is not restricted to the different embodiments described above, and it may incorporate appropriate combinations, substitutes and modifications in a range that is not outside of the object and gist of the invention. Incidentally, the ordinal terms "first" and "second" as used throughout the present description serve merely to distinguish between the numbered embodiments and are not used to mean any relative ordering, precedence or importance.

REFERENCE SIGNS LIST

1 Excreta treatment sheet for animals
2 Top sheet
3 Absorbent body
31 Colored sheet
32 Absorbent core
33 Core wrap sheet
4 Back sheet
5 Joining section
6 Water-blocking section
61 First water-blocking section
61s First water-blocking subdivision
61b First intermittent section
62 Second water-blocking section
62s Second water-blocking subdivision
62b Second intermittent section
63 Third water-blocking section
63s Third water-blocking subdivision
63b Third intermittent section
$A_1$ Center section
$A_2$ Outer peripheral section

The invention claimed is:

1. An excreta treatment sheet for animals comprising a liquid-permeable top sheet, a liquid-impermeable back sheet and an absorbent body situated between these sheets, wherein
the excreta treatment sheet for animals has a first surface as an excreta supply surface and a second surface as a surface on a side opposite the first surface, while also having, in a plan view, a center section located at a center of the excreta treatment sheet for animals and delineated as a portion where the top sheet, absorbent body and back sheet overlap in a thickness direction, and an outer peripheral section enclosing the center section and extending from outer edges of the center section toward outer edges of the excreta treatment sheet for animals, and
the excreta treatment sheet for animals also comprises, at the outer peripheral section, a joining section extending to surround the center section and having the top sheet and back sheet joined by an adhesive, and a water-blocking section extending so as to overlap in the thickness direction with at least a portion of the joining section, and being exposed without protruding from the first surface, wherein the excreta treatment sheet for animals has a quadrilateral outer shape with a first direction and a second direction that are mutually perpendicular, and the water-blocking section overlaps with the absorbent body in at least one direction from among the first direction and second direction, wherein the water-blocking section includes:

a first water-blocking section extending intermittently along either or both the first direction and the second direction, the first water-blocking section comprising first water-blocking subdivisions and first intermittent sections alternately aligned, and a second water-blocking section extending intermittently along a direction parallel to a direction in which the first water-blocking section extends, on an outer side in a direction perpendicular to the direction in which the first water-blocking section extends, the second water-blocking section comprising second water-blocking subdivisions and second intermittent sections alternately aligned, and the second water-blocking subdivisions overlap with the first intermittent sections in the direction perpendicular to the direction in which the first water-blocking section extend.

2. The excreta treatment sheet for animals according to claim 1, wherein the top sheet is composed of a sheet fiber structure, and the water-blocking section is composed of a fused section that is fused by constituent fibers of the fiber structure being melted together.

3. The excreta treatment sheet for animals according to claim 1, wherein the water-blocking section is composed of an integrated part where the top sheet, adhesive and back sheet are integrated in the thickness direction.

4. The excreta treatment sheet for animals according to claim 1, wherein the top sheet is composed of a sheet fiber structure, and the water-blocking section is composed of a semi-fused section that is fused by constituent fibers of the fiber structure being partially melted together.

5. The excreta treatment sheet for animals according to claim 1, wherein the water-blocking section is composed of a water-repellent coating film.

6. The excreta treatment sheet for animals according to claim 1, wherein the top sheet has a protrusion-recess structure on a surface on an excreta supply surface side.

* * * * *